(12) United States Patent
Choi

(10) Patent No.: US 11,822,101 B2
(45) Date of Patent: Nov. 21, 2023

(54) LIQUID LENS MODULE, LENS ASSEMBLY INCLUDING THE SAME, AND CAMERA MODULE INCLUDING THE LENS ASSEMBLY

(71) Applicant: LG INNOTEK CO., LTD., Seoul (KR)

(72) Inventor: Yong Bok Choi, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 556 days.

(21) Appl. No.: 16/964,468

(22) PCT Filed: Jan. 21, 2019

(86) PCT No.: PCT/KR2019/000846
§ 371 (c)(1),
(2) Date: Jul. 23, 2020

(87) PCT Pub. No.: WO2019/146980
PCT Pub. Date: Aug. 1, 2019

(65) Prior Publication Data
US 2021/0048562 A1 Feb. 18, 2021

(30) Foreign Application Priority Data
Jan. 23, 2018 (KR) .................. 10-2018-0008345

(51) Int. Cl.
*G02B 3/14* (2006.01)
*G02B 7/28* (2021.01)
*G02B 27/64* (2006.01)

(52) U.S. Cl.
CPC .............. *G02B 3/14* (2013.01); *G02B 7/282* (2013.01); *G02B 27/64* (2013.01)

(58) Field of Classification Search
CPC ........ G02B 26/004; G02B 27/64; G02B 3/14; G02B 7/04; G02B 7/282; H04N 5/2254
See application file for complete search history.

(56) References Cited

U.S. PATENT DOCUMENTS 7,663,823 B2 * 2/2010 Chung ................. G02B 7/08
359/824
8,891,006 B2 * 11/2014 Afshari ............... H04N 5/2257
348/340
(Continued)

FOREIGN PATENT DOCUMENTS

CN 201477276 U 5/2010
CN 105516563 A 4/2016
(Continued)

OTHER PUBLICATIONS

Office Action dated Nov. 11, 2021 in Chinese Application No. 201980009901.8.
(Continued)

*Primary Examiner* — Joseph P Martinez
*Assistant Examiner* — Vipin Patel
(74) *Attorney, Agent, or Firm* — Saliwanchik, Lloyd & Eisenschenk

(57) ABSTRACT

A liquid lens module includes a liquid lens comprising "M" individual electrode sectors (where "M" is a positive integer of 2 or greater) and "N" common electrode sectors (where "N" is a positive integer of 1 or greater); an upper cover comprising first to $M^{th}$ individual terminals electrically connected to the first to $M^{th}$ individual electrode sectors, respectively, and exposed in a first direction perpendicular to an optical axis of an image sensor; and a lower cover configured to surround the liquid upper cover, the lower cover comprising first to $n^{th}$ common terminals (where $1 \le n \le N$) electrically connected to the first to $N^{th}$ common electrode sectors, respectively, and exposed in the first direction.

15 Claims, 14 Drawing Sheets

(56) References Cited

U.S. PATENT DOCUMENTS

| | | | |
|---|---|---|---|
| 10,830,985 B2 * | 11/2020 | Park | ..................... H02K 11/215 |
| 2007/0146894 A1 | 6/2007 | Humpston | |
| 2007/0147816 A1 * | 6/2007 | Humpston | ........... H04N 5/2254 |
| | | | 396/72 |
| 2011/0134303 A1 | 6/2011 | Jung et al. | |
| 2013/0306480 A1 * | 11/2013 | Chang | ..................... G02B 3/14 |
| | | | 204/547 |
| 2017/0315274 A1 | 11/2017 | Park et al. | |

FOREIGN PATENT DOCUMENTS

| | | |
|---|---|---|
| JP | 2006-243711 A | 9/2006 |
| JP | 2010-262247 A | 11/2010 |
| KR | 10-0843473 B1 | 7/2008 |
| KR | 10-2017-0129532 A | 11/2017 |
| WO | 2014/058023 A1 | 4/2014 |

OTHER PUBLICATIONS

International Search Report in International Application No. PCT/KR2019/000846, filed Jan. 21, 2019.
Supplementary European Search Report dated Sep. 8, 2021 in European Application No. 19743509.2.
Office Action dated Sep. 29, 2022 in Japanese Application No. 2020-540778.

\* cited by examiner

LIQUID LENS MODULE, LENS ASSEMBLY INCLUDING THE SAME, AND CAMERA MODULE INCLUDING THE LENS ASSEMBLY

CROSS-REFERENCE TO RELATED APPLICATIONS

This application is the U.S. national stage application of International Patent Application No. PCT/KR2019/000846, filed Jan. 21, 2019, which claims the benefit under 35 U.S.C. § 119 of Korean Application No. 10-2018-0008345, filed Jan. 23, 2018, the disclosures of each of which are incorporated herein by reference in their entirety.

TECHNICAL FIELD

Embodiments relate to a liquid lens module, a lens assembly including the same, and a camera module including the lens assembly.

BACKGROUND ART

People who use portable devices demand optical devices that have high resolution, are small, and have various photographing functions. For example, these various photographing functions may be at least one of an optical zoom-in/zoom-out function, an auto-focusing (AF) function, or a hand-tremor compensation or optical image stabilizer (OIS) function.

In a conventional art, in order to implement the above-described various photographing functions, a method of combining a plurality of lenses and directly moving the combined lenses is used. In the case in which the number of lenses is increased, however, the size of an optical device may increase.

The auto-focusing and hand-tremor compensation functions are performed by moving or tilting a plurality of lenses, which are fixed to a lens holder and are aligned along an optical axis, in an optical-axis direction or a direction perpendicular to the optical axis. To this end, a separate lens moving apparatus is used to move a lens assembly composed of a plurality of lenses. However, the lens moving apparatus has high power consumption, and an additional cover glass needs to be provided separately from a camera module in order to protect the lens moving apparatus, thus causing a problem in that the overall size of the conventional camera module increases. In order to solve this problem, studies have been conducted on a liquid lens module, which performs auto-focusing and hand-tremor compensation functions by electrically adjusting the curvature of an interface between two types of liquids.

DISCLOSURE

Technical Problem

Embodiments may provide a liquid lens module, which has a simple configuration, has high resistance to external impacts, and has a simple manufacturing process, and a lens assembly including the same.

The objects to be accomplished by the disclosure are not limited to the above-mentioned objects, and other objects not mentioned herein will be clearly understood by those skilled in the art from the following description.

Technical Solution

A camera module according to an embodiment may include a liquid lens including first to $M^{th}$ individual electrode sectors (where "M" is a positive integer of 2 or greater) and first to $N^{th}$ common electrode sectors (where "N" is a positive integer of 1 or greater), an upper cover including first to $M^{th}$ individual terminals electrically connected to the first to $M^{th}$ individual electrode sectors, respectively, and exposed in a first direction perpendicular to the optical axis of an image sensor, and a lower cover configured to surround the liquid lens together with the upper cover and including first to $n^{th}$ common terminals (where $1 \le n \le N$) electrically connected to the first to $N^{th}$ common electrode sectors, respectively, and exposed in the first direction.

For example, the lower cover may include first to $N^{th}$ common terminals electrically connected to the first to $N^{th}$ common electrode sectors, respectively, and exposed in the first direction.

For example, the lower cover may include a cover frame disposed so as to surround a side portion of the liquid lens, and a connection substrate disposed so as to surround the liquid lens together with the cover frame and including the common terminals connected to the first to $N^{th}$ common electrode sectors.

For example, the connection substrate may include a substrate frame, outer terminals protruding from an outer side of the substrate frame in the first direction and corresponding to the common terminals, and first to $N^{th}$ inner terminals protruding from an inner side of the substrate frame so as to be in contact with the first to $N^{th}$ common electrode sectors, respectively.

For example, the upper cover may include an upper opening disposed at a position oriented in the optical-axis direction or in a second direction parallel to the optical axis, and the lower cover may include a lower opening disposed at a position corresponding to the upper opening in the optical-axis direction or in the second direction.

For example, the upper cover may include first to $M^{th}$ upper contact portions disposed to be in electrical contact with the first to $M^{th}$ individual electrode sectors, respectively, and first to $M^{th}$ upper connection portions electrically connecting the first to $M^{th}$ upper contact portions to the first to $M^{th}$ individual terminals, respectively.

For example, the first to $M^{th}$ upper contact portions may have a shape protruding toward the first to $M^{th}$ individual electrode sectors, respectively.

For example, the first to $M^{th}$ upper contact portions may include first to $M^{th}$ contact through-holes formed at positions respectively corresponding to the first to $M^{th}$ individual electrode sectors, and first to $M^{th}$ conductive members embedded in the first to $M^{th}$ contact through-holes and electrically connecting the first to $M^{th}$ individual electrode sectors to the first to $M^{th}$ upper connection portions, respectively.

For example, the lower cover may include first to $N^{th}$ lower contact portions disposed to be in electrical contact with the first to $N^{th}$ common electrode sectors, respectively, and first to $N^{th}$ lower connection portions electrically connecting the first to $N^{th}$ lower contact portions to the first to $n^{th}$ common terminals.

For example, the first to $N^{th}$ lower contact portions may have a shape protruding toward the first to $N^{th}$ common electrode sectors, respectively.

For example, each of the first to $n^{th}$ common terminals may be electrically connected to a respective one of the lower contact portions adjacent thereto among the first to $N^{th}$ lower contact portions.

For example, the upper cover may include a plurality of protrusions protruding from a first contact surface formed to be in contact with the lower cover, and the lower cover may include a plurality of recesses formed in a second contact surface, formed to be in contact with the upper cover, at positions corresponding to the plurality of protrusions and having a shape corresponding to the plurality of protrusions. Alternatively, the upper cover may include a plurality of recesses formed in a first contact surface formed to be in contact with the lower cover, and the lower cover may include a plurality of protrusions protruding from a second contact surface, formed to be in contact with the upper cover, at positions corresponding to the plurality of recesses and having a shape corresponding to the plurality of recesses.

For example, the upper cover may include first and second outer side surfaces disposed so as to face each other in the first direction, and the first to $M^{th}$ individual terminals may be disposed on at least one of the first or second outer side surface.

For example, the liquid lens module may further include an adhesive member disposed in at least one of a first space between the upper cover and the liquid lens or a second space between the lower cover and the liquid lens.

A lens assembly according to another embodiment may include a holder including one sidewall having a first opening and an opposite sidewall having a second opening formed to face the first opening in a first direction perpendicular to the optical-axis direction, and a liquid lens module disposed in the holder. The liquid lens module may include a liquid lens including "M" individual electrode sectors (where "M" is a positive integer of 2 or greater) and "N" common electrode sectors (where "N" is a positive integer of 2 or greater), an upper cover including first to $M^{th}$ individual terminals electrically connected to the first to $M^{th}$ individual electrode sectors, respectively, and exposed through at least one of the first opening or the second opening, and a lower cover configured to surround the liquid lens together with the upper cover and including first to $n^{th}$ common terminals (where 1≤n≤N) electrically connected to the first to $N^{th}$ common electrode sectors and exposed through at least one of the first opening or the second opening.

A camera module according to still another embodiment may include an image sensor, a lens assembly disposed in an optical-axis direction of the image sensor, and a main board on which the image sensor is disposed, the main board being configured to supply a driving voltage. The lens assembly may include a holder including one sidewall having a first opening and an opposite sidewall having a second opening formed to face the first opening in a first direction perpendicular to the optical-axis direction, and a liquid lens module disposed in the holder. The liquid lens module may include a liquid lens including "M" individual electrode sectors (where "M" is a positive integer of 2 or greater) and "N" common electrode sectors (where "N" is a positive integer of 2 or greater), an upper cover including first to $M^{th}$ individual terminals electrically connected to the first to $M^{th}$ individual electrode sectors, respectively, and exposed through at least one of the first opening or the second opening, and a lower cover configured to surround the liquid lens together with the upper cover and including first to $n^{th}$ common terminals (where 1≤n≤N) electrically connected to the first to $N^{th}$ common electrode sectors and exposed through at least one of the first opening or the second opening.

Advantageous Effects

In a liquid lens module, a lens assembly including the same, and a camera module including the lens assembly according to embodiments, the liquid lens module may be protected from external impacts, and the number of components included in the liquid lens module may be reduced, thus reducing the number of items of the liquid lens module to be managed, reducing the number and duration of processes of manufacturing the liquid lens module, inhibiting the generation of an accumulated tolerance of the liquid lens module, and reducing a defect rate. Since individual tolerances are small, a problem of contact between the liquid lens module and peripheral components may not occur. Mass production of the liquid lens module may be possible due to the stable structure thereof. Even when the number of individual electrode sectors is large, for example, 8, electrical connection with a main board may be facilitated. A driving voltage may be easily supplied to the liquid lens module during active alignment.

However, the effects achievable through the disclosure are not limited to the above-mentioned effects, and other effects not mentioned herein will be clearly understood by those skilled in the art from the following description.

BEST MODE

Figure 1:
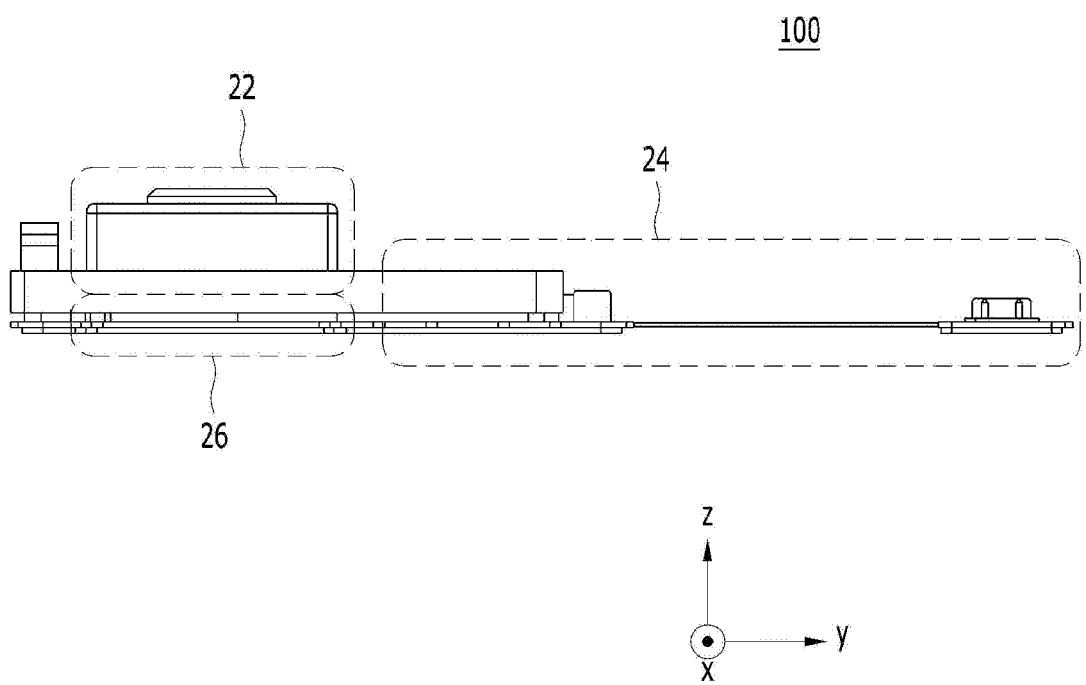
FIG. 1 illustrates a schematic side view of a camera module according to an embodiment.

Hereinafter, exemplary embodiments will be described in detail with reference to the accompanying drawings. While the disclosure is susceptible to various modifications and alternative forms, specific embodiments thereof are shown by way of example in the drawings. However, the disclosure should not be construed as being limited to the embodiments set forth herein, but on the contrary, the disclosure is to cover all modifications, equivalents, and alternatives falling within the spirit and scope of the embodiments.

It may be understood that, although the terms "first", "second", etc. may be used herein to describe various elements, these elements are not to be limited by these terms. These terms are generally only used to distinguish one element from another. In addition, terms particularly defined in consideration of the construction and operation of the embodiments are used only to describe the embodiments, but do not define the scope of the embodiments.

In the following description of the embodiments, it will be understood that, when each element is referred to as being "on" or "under" another element, it can be directly on or under the other element, or can be indirectly formed such that one or more intervening elements are also present. In addition, when an element is referred to as being "on" or "under", "under the element" as well as "on the element" may be included based on the element.

In addition, relational terms, such as "on/upper part/above" and "under/lower part/below", are used only to distinguish between one subject or element and another subject or element, without necessarily requiring or involving any physical or logical relationship or sequence between such subjects or elements.

The terms used in the present specification are used for explaining a specific exemplary embodiment, not to limit the present disclosure. Singular expressions include plural expressions unless clearly specified otherwise in context. In the specification, the terms "comprising" or "including" shall be understood to designate the presence of features, numbers, steps, operations, elements, parts, or combinations thereof, but not to preclude the presence or addition of one or more other features, numbers, steps, operations, elements, parts, or combinations thereof.

Unless otherwise defined, all terms including technical and scientific terms used herein have the same meaning as commonly understood by one of ordinary skill in the art to which the disclosure pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, a liquid lens module, a lens assembly including the same, and a camera module including the lens assembly according to embodiments will be described using the Cartesian coordinate system, but the embodiments are not limited thereto. That is, in the Cartesian coordinate system, the x-axis, the y-axis and the z-axis are perpendicular to one another, but the embodiments are not limited thereto. That is, the x-axis, the y-axis, and the z-axis may cross one another, rather than being perpendicular to one another.

Hereinafter, before explaining a liquid lens module according to the embodiment, a lens assembly including the liquid lens module and a camera module including the lens assembly will be described, but the embodiment is not limited thereto. That is, the liquid lens module according to the embodiment may also be applied to a lens assembly and a camera module having configurations different from those of the lens assembly and the camera module to be described below. That is, the lens assembly and the camera module to be described below are mere examples to which the liquid lens module according to the embodiment may be applied.

Hereinafter, a camera module 100 according to an embodiment will be described with reference to FIGS. 1 to 3 and 8.

FIG. 1 illustrates a schematic side view of the camera module 100 according to an embodiment.

Referring to FIG. 1, the camera module 100 may include a lens assembly 22, a control circuit 24, and an image sensor 26.

First, the lens assembly 22 may include a plurality of lens units and a holder in which the plurality of lens units is accommodated. As will be described below, the plurality of lens units may include a liquid lens module, and may further include a first lens unit or a second lens unit. Alternatively, the plurality of lens units may include first and second lens units and a liquid lens module.

The control circuit 24 serves to supply a driving voltage (or an operation voltage) to the liquid lens module.

The control circuit 24 and the image sensor 26 described above may be disposed on a single printed circuit board (PCB), but this is merely given by way of example, and the embodiment is not limited thereto.

When the camera module 100 according to the embodiment is applied to an optical device (or an optical instrument), the configuration of the control circuit 24 may be designed in different ways depending on the specifications required in the optical device. In particular, the control circuit 24 may be implemented as a single chip so as to reduce the magnitude of the driving voltage applied to the lens assembly 22. Thereby, the size of an optical device mounted in a portable device may be further reduced.

Figure 2:
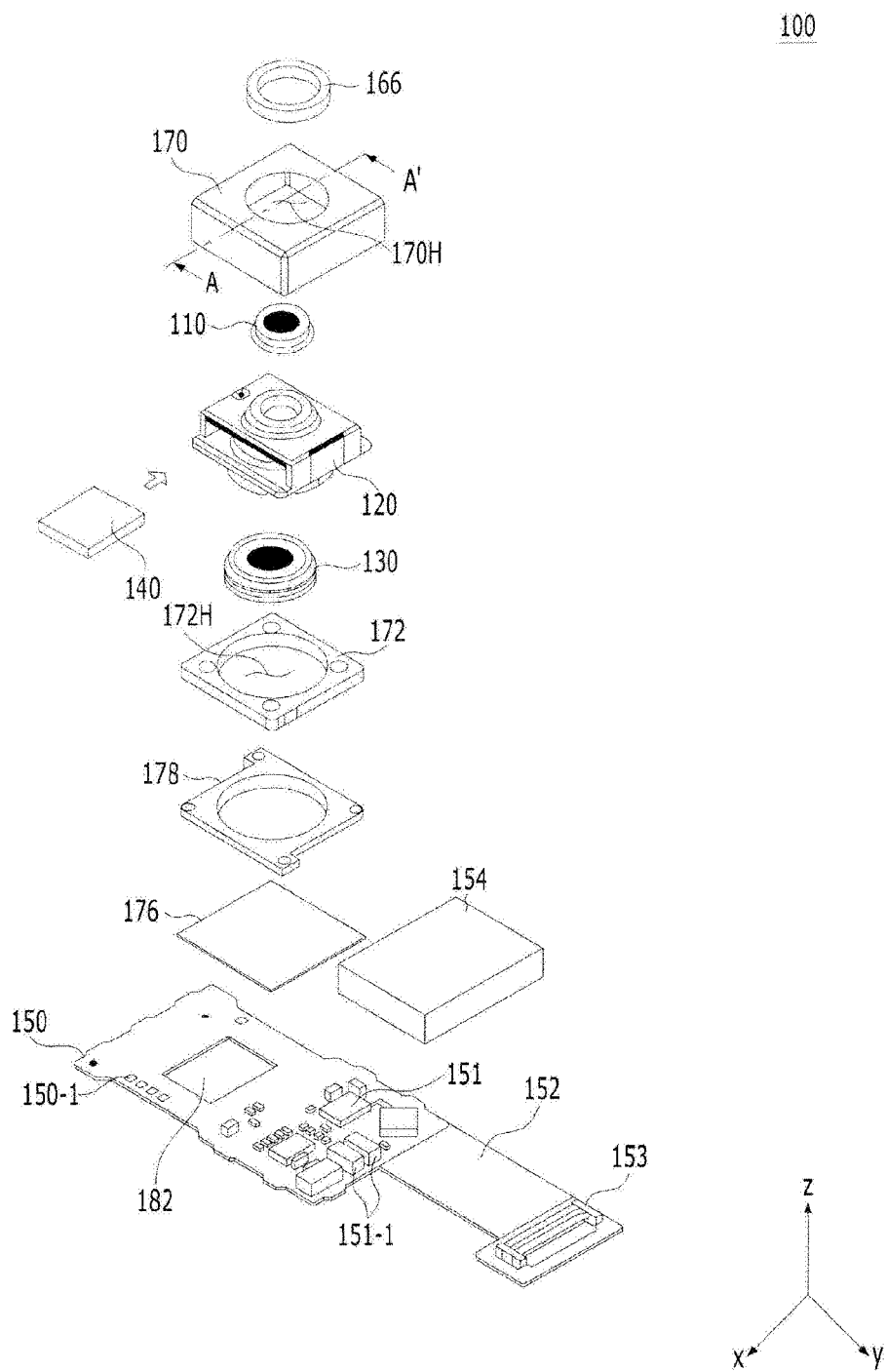
FIG. 2 illustrates an exploded perspective view of an embodiment of the camera module shown in FIG. 1.

FIG. 2 illustrates an exploded perspective view of an embodiment of the camera module 100 shown in FIG. 1.

Referring to FIG. 2, the camera module 100 may include a lens assembly, a main board 150, and an image sensor 182. In addition, the camera module 100 may further include a first cover 170 and a middle base 172. In addition, the camera module 100 may further include a sensor base 178 and a filter 176. Unlike the illustration in FIG. 2, neither of the sensor base 178 and the filter 176 may be included. In addition, the camera module 100 may further include a second cover 154.

According to the embodiment, at least one of the components 110, 120, 130, 150, 154, 166, 170, 172, 176 and 178, other than a liquid lens module 140 and the image sensor 182, may be omitted from the camera module 100 shown in FIG. 2. Alternatively, at least one component different from the components 110 to 178 shown in FIG. 2 may be further included in the camera module 100.

Referring to FIG. 2, the lens assembly may include the liquid lens module 140. In addition, the lens assembly may further include at least one of a first lens unit 110, a holder 120, or a second lens unit 130. The lens assembly shown in FIG. 2 may correspond to the lens assembly 22 shown in FIG. 1, and may be disposed on the main board 150.

In the lens assembly, the first lens unit 110 and the second lens unit 130 may be referred to as a 'first solid lens unit' and a 'second solid lens unit', respectively, in order to be distinguished from the liquid lens module 140.

The first lens unit 110 may be disposed at the upper side of the lens assembly, and may be a region on which light is incident from outside the lens assembly. That is, the first lens unit 110 may be disposed above the liquid lens module 140 within the holder 120. The first lens unit 110 may be implemented using a single lens, or may be implemented using two or more lenses that are aligned along a center axis to form an optical system.

Here, the center axis may be an optical axis LX of the optical system, which is formed by the first lens unit 110 included in the camera module 100, the liquid lens included in the liquid lens module 140, and the second lens unit 130, or may be an axis parallel to the optical axis LX. The optical axis LX may correspond to the optical axis of the image sensor 182. That is, the first lens unit 110, the liquid lens of the liquid lens module 140, the second lens unit 130, and the image sensor 182 may be aligned with each other along the optical axis LX through active alignment (AA).

Here, active alignment may mean an operation of aligning the optical axes of the first lens unit 110, the second lens unit 130, and the liquid lens of the liquid lens module 140 with each other and adjusting an axial relationship or distance relationship between the image sensor 182 and the lens units 110, 130 and 140 in order to acquire an improved image.

In addition, an exposure lens may be disposed at the upper side of the first lens unit 110. Here, the exposure lens may be the outermost lens among the lenses included in the first lens unit 110. That is, the lens located at the uppermost side of the first lens unit 110 may protrude upwards, and therefore, may function as the exposure lens. The exposure lens faces the risk of damage to the surface thereof since it protrudes outwards from the holder 120. When the surface of the exposure lens is damaged, the quality of an image captured by the camera module 100 may be deteriorated. Therefore, in order to inhibit or suppress damage to the surface of the exposure lens, a cover glass may be disposed, or a coating layer may be formed on the top of the exposure lens. Alternatively, in order to inhibit damage to the surface of the exposure lens, the exposure lens may be formed of a wear-resistant material having higher rigidity than the lenses of the other lens units.

Figure 3:
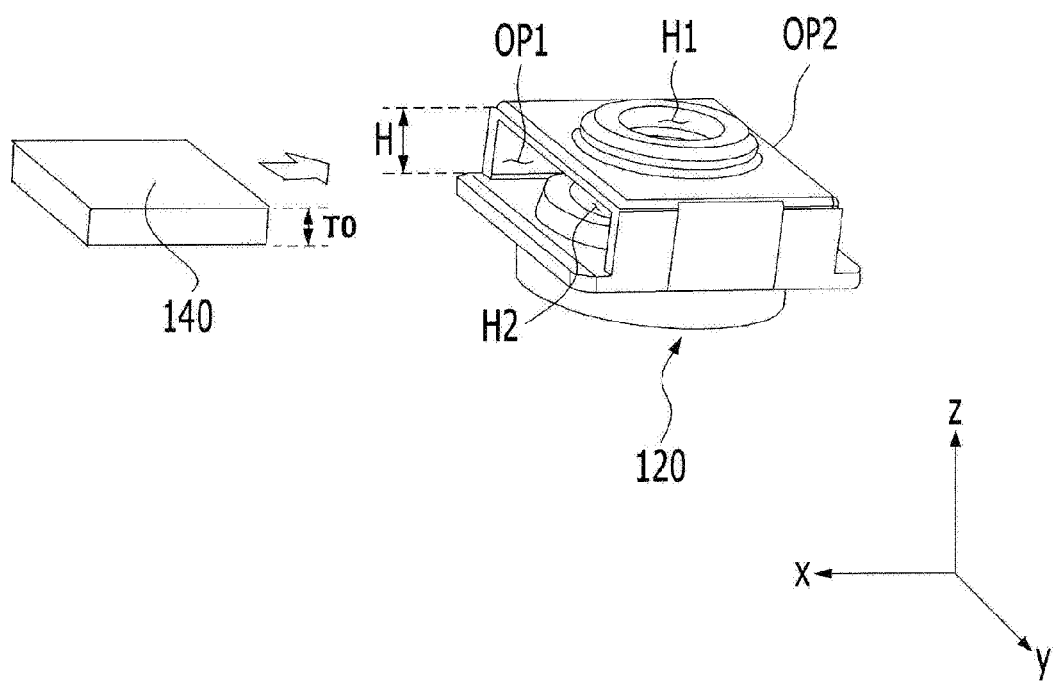
FIG. 3 is an exploded perspective view for explaining the configurations of the holder and the liquid lens module shown in FIG. 2.

FIG. 3 is an exploded perspective view for explaining the configurations of the holder 120 and the liquid lens module 140 shown in FIG. 2.

The holder 120 shown in FIG. 3 may include first and second holes H1 and H2 and first to fourth sidewalls (side surfaces or side portions). The holder 120 may be spaced apart from a circuit element 151, and may be disposed on the main board 150.

The first and second holes H1 and H2 may be formed respectively in the upper portion and the lower portion of the holder 120 to open the upper portion and the lower portion of the holder 120, respectively. Here, the first hole H1 and the second hole H2 may be through-holes, or may be blind holes. The first lens unit 110 may be accommodated in, mounted in, seated in, in contact with, fixed to, provisionally fixed to, supported by, coupled to, or disposed in the first hole H1, which is formed in the holder 120, and the second lens unit 130 may be accommodated in, mounted in, seated in, in contact with, fixed to, provisionally fixed to, supported by, coupled to, or disposed in the second hole H2, which is formed in the holder 120.

In addition, the first and second sidewalls of the holder 120 may be disposed so as to face each other in a first direction (e.g. the x-axis direction) perpendicular to the direction of the optical axis LX, and the third and fourth sidewalls may be disposed so as to face each other in a second direction (e.g. the y-axis direction) perpendicular to the direction of the optical axis LX. In addition, as illustrated in FIG. 3, the first sidewall of the holder 120 may include a first opening OP1, and the second sidewall thereof may include a second opening OP2 having a shape that is the same as or similar to that of the first opening OP1. Thus, the first opening OP1 disposed in the first sidewall and the second opening OP2 disposed in the second sidewall may be disposed so as to face each other in the first direction (e.g. the x-axis direction) perpendicular to the direction of the optical axis LX.

The inner space in the holder 120, in which the liquid lens module 140 is disposed, may be open due to the first and second openings OP1 and OP2. In this case, the liquid lens module 140 may be inserted through the first or second opening OP1 or OP2 so as to be mounted in, seated in, in contact with, fixed to, provisionally fixed to, supported by, coupled to, or disposed in the inner space in the holder 120. For example, the liquid lens module 140 may be inserted into the inner space in the holder 120 through the first opening OP1.

As such, in order to allow the liquid lens module 140 to be inserted into the inner space in the holder 120 through the first or second opening OP1 or OP2, the size of the first or second opening OP1 or OP2 in the holder 120 in the direction of the optical axis LX may be greater than the size of the liquid lens module 140 in the z-axis direction. For example, the height H corresponding to the size of each of the first and second openings OP1 and OP2 in the direction of the optical axis LX may be greater than the thickness TO of the liquid lens module 140. That is, when viewed from the x-axis direction, the area of each of the first and second openings OP1 and OP2 may be greater than the area of the liquid lens module 140.

The second lens unit 130 may be disposed below the liquid lens module 140 within the holder 120. The second lens unit 130 may be spaced apart from the first lens unit 110 in the optical-axis direction (e.g. the z-axis direction).

The light introduced into the first lens unit 110 from outside the camera module 100 may pass through the liquid lens module 140 and may be introduced into the second lens unit 130. The second lens unit 130 may be implemented using a single lens, or may be implemented using two or more lenses, which are aligned along the center axis to form an optical system.

Unlike the liquid lens of the liquid lens module 140, each of the first lens unit 110 and the second lens unit 130 may be a solid lens formed of glass or plastic, but the embodiment is not limited as to a specific material of each of the first lens unit 110 and the second lens unit 130.

Referring again to FIG. 2, the first cover 170 may be disposed so as to surround the holder 120, the liquid lens module 140, and the middle base 172, and may protect these 120, 140 and 172 from external impacts. In particular, when the first cover 170 is disposed, a plurality of lenses, which form an optical system, may be protected from external impacts.

In addition, the first cover 170 may include an upper opening 170H formed in the top surface thereof so that the first lens unit 110 disposed in the holder 120 is exposed to external light. In addition, a window formed of a light-transmissive material may be disposed in the upper opening 170H, thereby inhibiting foreign substances, such as dust or moisture, from entering the camera module 100. The adhesive member 166 may be disposed so as to fill the space (or the gap) SP between the upper surface of the holder 120 and the first cover 170. In some cases, the adhesive member 166 may be omitted. In addition, the first cover 170 may be disposed so as to cover the top surface and the first to fourth sidewalls of the holder 120.

In addition, the middle base 172 may be disposed so as to surround the second hole H2 in the holder 120. To this end, the middle base 172 may include an accommodation hole 172H for accommodating the second hole H2 therein. The inner diameter of the middle base 172 (i.e. the diameter of the accommodation hole 172H) may be equal to or greater than the outer diameter of the second hole H2. Here, each of the accommodation hole 172H in the middle base 172 and the second hole H2 is illustrated as having a circular shape, but the embodiment is not limited thereto, and these holes may be changed to various other shapes. In the same manner as the upper opening 170H in the first cover 170, the accommodation hole 172H may be formed near the center of the middle base 172 at a position corresponding to the position of the image sensor 182, which is disposed in the camera module 100.

When the sensor base 178 is omitted, the middle base 172 may be spaced apart from the circuit element 151, and may be mounted on the main board 150, and when the sensor base 178 is not omitted, the middle base 172 may be mounted on the sensor base 178.

Meanwhile, the filter 176 may filter light within a specific wavelength range, among the light that has passed through the first lens unit 110, the liquid lens module 140, and the second lens unit 130. The filter 176 may be an infrared (IR) light blocking filter or an ultraviolet (UV) light blocking filter, but the embodiment is not limited thereto. The filter 176 may be disposed above the image sensor 182, and may be disposed inside the sensor base 178.

The sensor base 178 may be disposed below the middle base 172, and may be attached to the main board 150. The sensor base 178 may surround the image sensor 182, and may protect the image sensor 182 from foreign substances or external impacts.

Meanwhile, the main board 150 may include a recess in which the image sensor 182 may be mounted, seated, tightly disposed, fixed, provisionally fixed, supported, coupled, or accommodated, the circuit element 151, a connection part (or an FPCB) 152, and a connector 153. In addition, the main board 150 may further include a plurality of terminals 150-1. The terminals 150-1 are parts that are connected to the liquid lens module 140 in order to supply a driving voltage to the liquid lens. However, the main board 150 and the liquid lens module 140 may be electrically connected to each other in any of various manners, e.g. using a wire (not shown). However, the embodiment is not limited as to a specific manner in which the liquid lens module 140 is connected to the main board 150. Therefore, the main board 150 may not include the terminals 150-1.

When the filter 176 and the sensor base 178 are omitted, the main board 150 may be disposed below the middle base 172.

However, when the filter 176 and the sensor base 178 are not omitted, the main board 150 may be disposed below the sensor base 178. That is, the sensor base 178 may be mounted on the main board 150 while being spaced apart from the circuit element 151. In this case, the middle base 172 and the holder 120, in which the second lens unit 130, the liquid lens module 140 and the first lens unit 110 are disposed, may be disposed on the sensor base 178.

The circuit element 151 of the main board 150 may constitute a control module, which controls the liquid lens module 140 and the image sensor 182. Here, the control module will be described later with reference to FIG. 8. The circuit element 151 may include at least one of a passive element or an active element, and may have any of various areas and heights. The circuit element 151 may be provided in a plural number. The plurality of circuit elements 151 may be disposed so as not overlap the holder 120 in the direction parallel to the optical axis LX. For example, the plurality of circuit elements 151 may include a power inductor 151-1, a gyro sensor, and the like, but the embodiment is not limited as to a specific type of the circuit elements 151. Some of the plurality of circuit elements 151 may cause electromagnetic interference (EMI) or noise. In particular, among the plurality of circuit elements 151, the power inductor 151-1 may cause greater EMI than other elements. In order to block EMI or noise, the second cover 154 may be disposed so as to cover the circuit elements 151 disposed in the element region of the main board 150, and may perform an electromagnetic shielding function. In addition, the second cover 154 may be disposed so as to cover the circuit elements 151, thereby protecting the circuit elements 151 from external impacts. To this end, the second cover 154 may include an accommodation space for accommodating the circuit elements 151 therein and covering the same, in consideration of the shape and position of the circuit elements 151.

The main board 150 may be implemented as a rigid flexible printed circuit board (RFPCB) including the FPCB 152. The FPCB 152 may be subjected to bending based on the requirement of the space in which the camera module 100 is mounted.

The connector 153 may electrically connect the main board 150 to a power supply or any other device (e.g. an application processor) outside the camera module 100.

Meanwhile, the image sensor 182 may function to convert the light that has passed through the first lens unit 110, the liquid lens of the liquid lens module 140, and the second lens unit 130 of the lens assembly 110, 120, 130 and 140 into image data. More specifically, the image sensor 182 may convert light into analog signals through a pixel array including a plurality of pixels, and may synthesize digital signals corresponding to the analog signals to thereby generate image data.

Hereinafter, the liquid lens modules 140A, 140B and 140C according to embodiments will be described with reference to FIGS. 4A to 7C. The liquid lens modules 140A, 140B and 140C according to embodiments may correspond to the liquid lens module 140 shown in FIGS. 2 and 3. Therefore, the above description of the liquid lens module 140 may be applied to the liquid lens modules 140A, 140B and 140C. For example, at least a portion of each of the liquid lens modules 140A, 140B and 140C may be disposed in at least one of the first opening OP1 or the second opening Op2 shown in FIG. 3. Alternatively, the liquid lens modules 140A, 140B and 140C may not be disposed in each of the first and second openings OP1 and OP2.

Figure 4A:
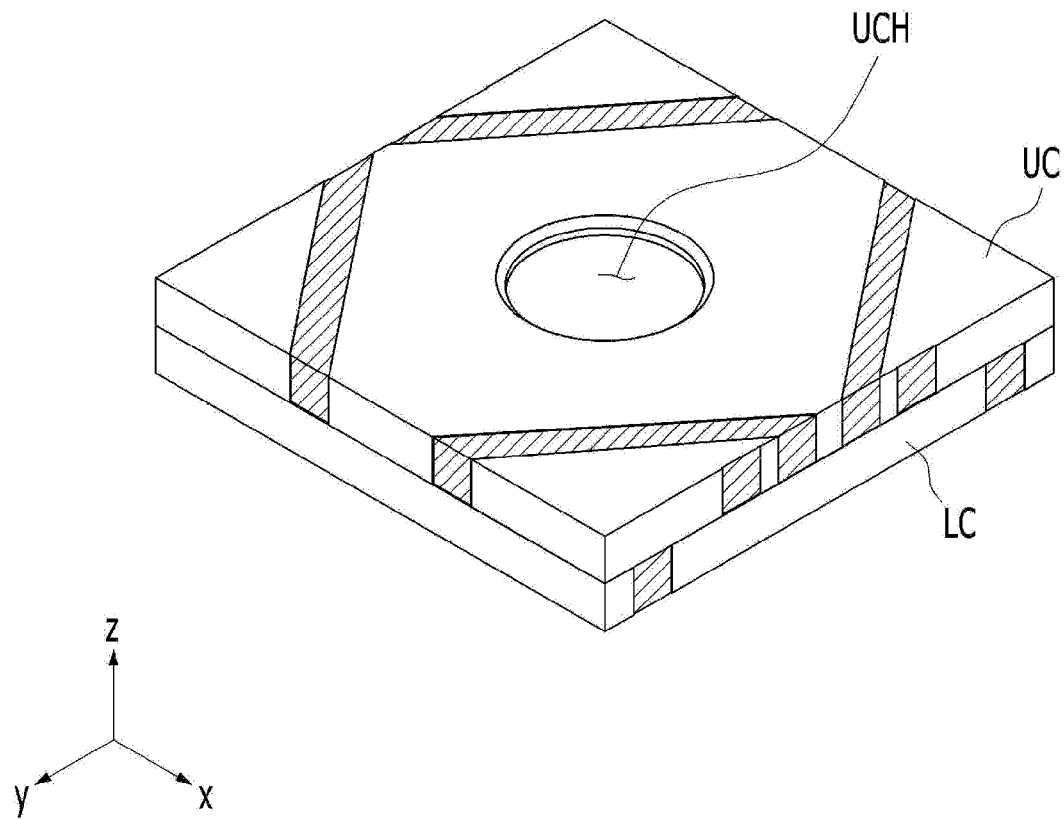
FIG. 4A illustrates a coupled perspective view of a liquid lens module according to an embodiment.
Figure 4B:
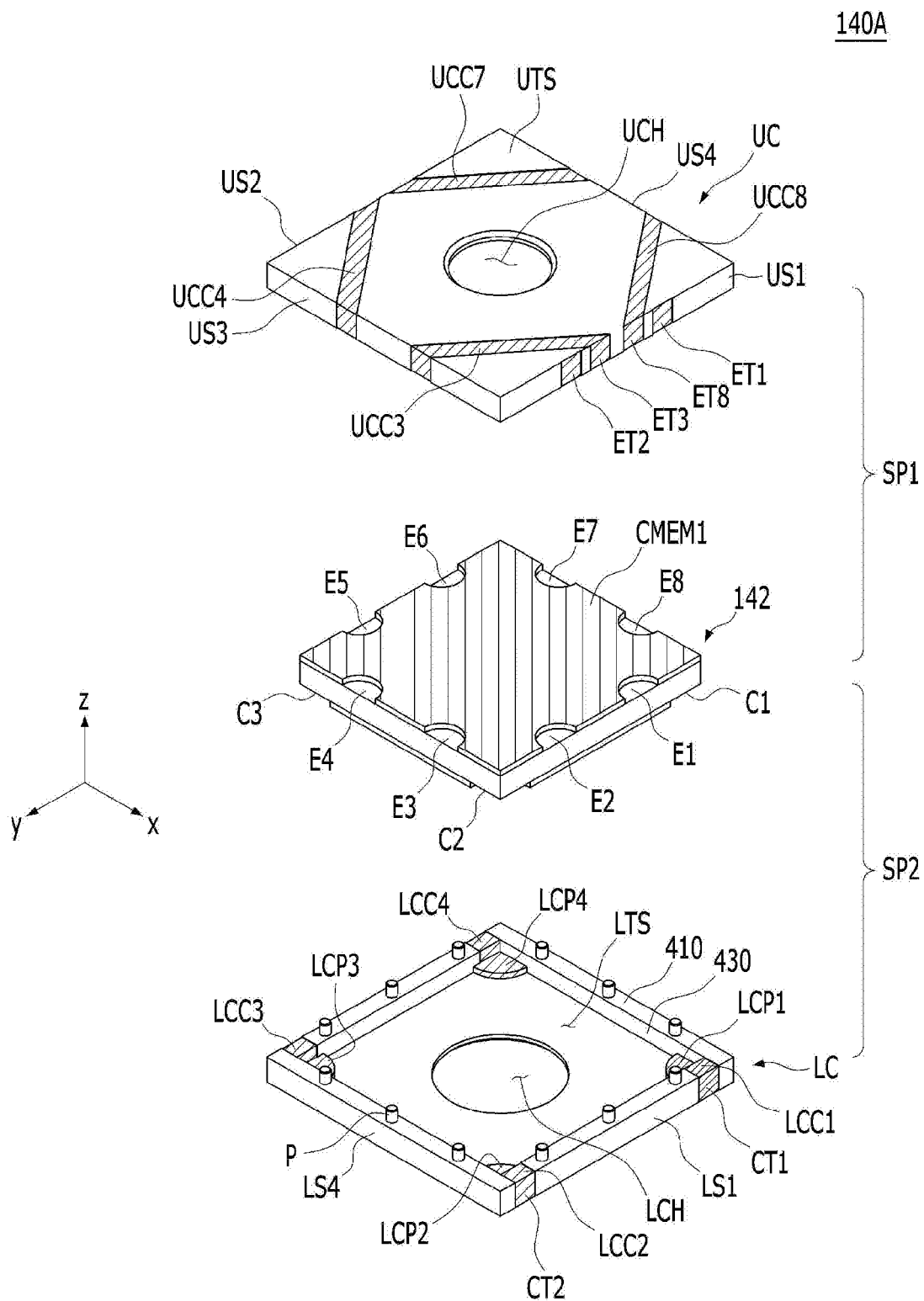
FIG. 4B illustrates an exploded top perspective view of the liquid lens module shown in FIG. 4A.
Figure 4C:
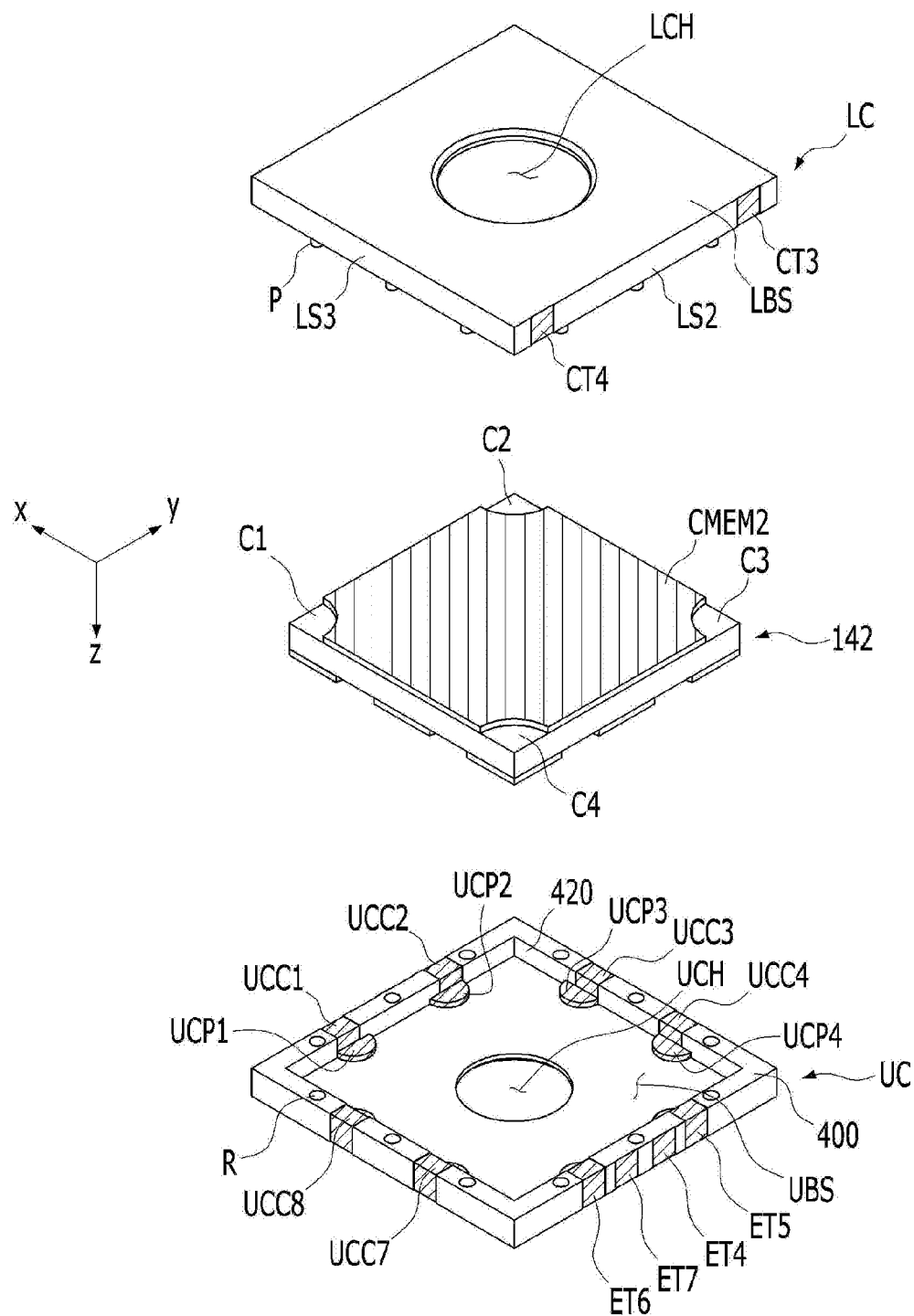
FIG. 4C illustrates an exploded bottom perspective view of the liquid lens module shown in FIG. 4A.

FIG. 4A illustrates a coupled perspective view of a liquid lens module 140A according to an embodiment, FIG. 4B illustrates an exploded top perspective view of the liquid lens module 140A shown in FIG. 4A, and FIG. 4C illustrates an exploded bottom perspective view of the liquid lens module 140A shown in FIG. 4A.

Referring to FIGS. 4A to 4C, the liquid lens module 140A may include an upper cover (UC), a liquid lens 142, and a lower cover LC.

The liquid lens 142 may include "M" individual electrodes (or upper electrodes) and one common electrode (or a lower electrode). Here, "M" is a positive integer of 2 or greater.

Hereinafter, the description with reference to FIGS. 4A to 4C, 6A to 6C, and 7A to 7C will be made on the assumption that M=8, but the following description may also be applied to the case in which "M" is less than or greater than 8. In addition, the number of individual electrodes and the number of individual electrode sectors will be described as being the same as each other, but the number of individual electrodes may be greater than or less than the number of individual electrode sectors, and the following description may also be applied to this case.

Hereinafter, an example of the liquid lens 142 of the liquid lens module 140A, 140B or 140C according to the above-described embodiment will be described with reference to FIG. 5.

Figure 5:
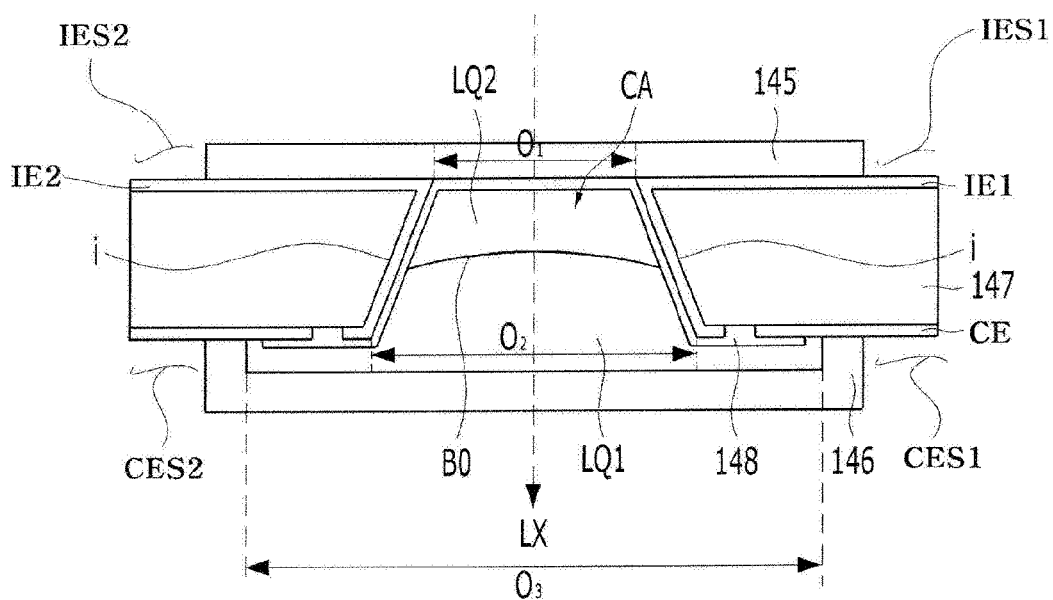
FIG. 5 illustrates a cross-sectional view of an embodiment of the liquid lens module shown in FIGS. 4A to 4C.

FIG. 5 illustrates a cross-sectional view of an embodiment of the liquid lens module 140A shown in FIGS. 4A to 4C.

The liquid lens 142 may include a cavity CA. As shown in FIG. 5, the open area of the cavity CA that is oriented in the direction in which light is introduced may be smaller than the open area of the cavity CA that is oriented in the opposite direction. Alternatively, the liquid lens 142 may be disposed such that the direction of inclination of the cavity CA is opposite what is illustrated. That is, the open area of the cavity CA that is oriented in the direction in which light is introduced may be larger than the open area of the cavity CA that is oriented in the opposite direction. In addition, when the liquid lens 142 is disposed such that the direction of inclination of the cavity CA is opposite what is illustrated, the arrangement of all or some of the components included in the liquid lens 142 may be changed, or only the direction of inclination of the cavity CA may be changed and the arrangement of the remaining components may not be changed, according to the direction of inclination of the liquid lens 142.

In the liquid lens module shown in FIG. 5, the liquid lens 142 may include a plurality of different types of liquids LQ1 and LQ2, first to third plates 147, 145 and 146, individual electrodes IE1 and IE2, a common electrode CE, and an insulating layer 148.

The liquids LQ1 and LQ2 may be accommodated in the cavity CA, and may include a first liquid LQ1, which is conductive, and a second liquid (or an insulative liquid) LQ2, which is non-conductive. The first liquid LQ1 and the second liquid LQ2 may not mix with each other, and an interface BO may be formed at a contact portion between the first and second liquids LQ1 and LQ2. For example, the second liquid LQ2 may be disposed on the first liquid LQ1, but the embodiment is not limited thereto.

The first liquid LQ1 may be conductive, and may be formed of, for example, a mixture of ethylene glycol and sodium bromide (NaBr). The second liquid LQ2 may be oil, and for example, may be phenyl-based silicon oil. Each of the first liquid LQ1 and the second liquid LQ2 may include at least one of a sterilizer or an antioxidant. The antioxidant may be a phenyl-based antioxidant or a phosphorus (P)-based antioxidant. In addition, the sterilizer may be any one of alcohol-based, aldehyde-based, and phenol-based sterilizers. When each of the first liquid LQ1 and the second liquid LQ2 includes an antioxidant and a sterilizer, it is possible to inhibit a change in the physical properties of the first and second liquids LQ1 and LQ2 due to oxidation of the first and second liquids LQ1 and LQ2 or propagation of microorganisms.

The inner surface of the first plate 147 may form a sidewall i of the cavity CA. The first plate 147 may include upper and lower openings having a predetermined inclined surface. That is, the cavity CA may be defined as a region surrounded by the inclined surface of the first plate 147, a third opening in contact with the second plate 145, and a fourth opening in contact with the third plate 146.

The diameter of the opening that is larger among the third and fourth openings may vary depending on the field of view (FOV) required for the liquid lens 142 or the role that the liquid lens 142 plays in the camera module 100. According to the embodiment, the size (the area or the width) of the third opening $O_1$ may be greater than the size (the area or the width) of the fourth opening $O_2$. Here, the size of each of the third and fourth openings may be the cross-sectional area in the horizontal direction (e.g. the x-axis direction or the y-axis direction) perpendicular to the optical axis LX.

Each of the third and fourth openings may take the form of a hole having a circular cross-section, and the inclined surface thereof may have an inclination angle ranging from 55° to 65° or an inclination angle ranging from 50° to 70°. The interface BO formed by the two liquids LQ1 and LQ2 may be moved along the inclined surface of the cavity CA by a driving voltage.

The first liquid LQ1 and the second liquid LQ2 are charged, accommodated, or disposed in the cavity CA in the first plate 147. In addition, the cavity CA is a portion through which the light that has passed through the first lens unit 110 passes. Therefore, the first plate 147 may be formed of a transparent material, or may include impurities so that light does not easily pass therethrough.

The individual electrodes IE1 and IE2 may be disposed on one surface of the first plate 147, and the common electrode CE may be disposed on another surface of the first plate 147. The individual electrodes IE1 and IE2 may be spaced apart from each other, with the first plate 147 interposed therebetween. For example, the individual electrodes IE1 and IE2 may be disposed on one surface of the first plate 147 (e.g. the top surface, the side surface, or the bottom surface), and the common electrode CE may be disposed on another surface of the first plate 147 (e.g. the bottom surface), and may be in direct contact with the first liquid LQ1.

Each of the individual electrodes IE1 and IE2 shown in FIG. 5 may correspond to the first to $M^{th}$ individual electrodes shown in FIGS. 4A to 4C.

Each of the individual electrodes IE1 and IE2 may include at least one electrode sector (hereinafter, referred to as an 'individual electrode sector'). For example, each of the individual electrodes IE1 and IE2 may include one individual electrode sector, or may include a plurality of individual electrode sectors. As shown in FIG. 5, the first individual electrode IE1 may include a first individual electrode sector IES1, which is exposed rather than being covered by the second plate 145, and the second individual electrode IE2 may include a second individual electrode sector IES2, which is exposed rather than being covered by the second plate 145. That is, the individual electrode sector may mean the portion of the individual electrode that is exposed rather than being covered by the second plate 145.

As shown in FIG. 4B, the first individual electrode may include a first individual electrode sector E1, the second individual electrode may include a second individual electrode sector E2, the third individual electrode may include a third individual electrode sector E3, the fourth individual electrode may include a fourth individual electrode sector E4, the fifth individual electrode may include a fifth individual electrode sector E5, the sixth individual electrode may include a sixth individual electrode sector E6, the seventh individual electrode may include a seventh individual electrode sector E7, and the eighth individual electrode may include an eighth individual electrode sector E8. In addition, the first to eighth individual electrode sectors E1 to E8 may be sequentially arranged in the clockwise direction (or the counterclockwise direction) about the optical axis.

In addition, the common electrode CE may include "N" electrode sectors (hereinafter, referred to as 'common electrode sectors'). Here, "N" may be a positive integer of 1 or greater. For example, the common electrode may include at least one common electrode sector. As shown in FIG. 5, the common electrode CE may include a first common electrode sector CES1 and a second common electrode sector CES2, which are exposed rather than being covered by the third plate 146. That is, the common electrode sector may mean the portion of the common electrode that is exposed rather than being covered by the third plate 146. The portion of the common electrode CE that is disposed on the other surface of the first plate 147 may be exposed to the first liquid LQ1, which is conductive.

As shown in FIG. 4C, the common electrode CE may include first to fourth common electrode sectors C1 to C4 (when N=4). In addition, the first to fourth common electrode sectors C1 to C4 may be sequentially arranged in the clockwise direction (or the counterclockwise direction) about the optical axis.

Each of the individual and common electrodes IE1, IE2 and CE may be formed of a conductive material, e.g. metal, and specifically, may include chrome (Cr). Chromium or chrome is a glossy silver rigid transition metal, which is fragile, does not readily discolor, and has a high melting point. In addition, since an alloy including chromium exhibits high corrosion resistance and rigidity, chromium may be used in the form of being alloyed with other metals. In particular, since chrome (Cr) is not easily corroded or discolored, chrome exhibits high resistance to the first liquid LQ1, which is conductive and is charged in the cavity CA.

In addition, the second plate 145 may be disposed on the surfaces of the individual electrodes IE1 and IE2. That is, the second plate 145 may be disposed on the first plate 147. Specifically, the second plate 145 may be disposed on the top surfaces of the individual electrodes IE1 and IE2 and on the cavity CA.

The third plate 146 may be disposed on the surface of the common electrode CE. That is, the third plate 146 may be disposed under the first plate 147. Specifically, the third plate 146 may be disposed on the bottom surface of the common electrode CE and under the cavity CA.

The second plate 145 and the third plate 146 may be disposed so as to face each other, with the first plate 147 interposed therebetween. In addition, at least one of the second plate 145 or the third plate 146 may be omitted. At least one of the second plate 145 or the third plate 146 may have a rectangular planar shape. Each of the second and third plates 145 and 146 may be a region through which light passes, and may be formed of a light-transmissive material. For example, each of the second and third plates 145 and 146 may be formed of glass, and may be formed of the same material for convenience of processing. In addition, the edge of each of the second and third plates 145 and 146 may have a rectangular shape, without being necessarily limited thereto.

The second plate 145 may be configured to allow the light introduced from the first lens unit 110 to travel into the cavity CA in the first plate 147.

The third plate 146 may be configured to allow the light that has passed through the cavity CA in the first plate 147 to travel to the second lens unit 130. The third plate 146 may be in direct contact with the first liquid LQ1.

According to the embodiment, the third plate 146 may have a diameter $O_3$ greater than the diameter $O_2$ of the opening that is larger among the third and fourth openings in the first plate 147. In addition, the third plate 146 may include a peripheral region that is spaced apart from the first plate 147.

In addition, the actual effective lens area of the liquid lens 142 may be smaller than the diameter (e.g. $O_2$) of the opening that is larger among the third and fourth openings in the first plate 147. For example, when a region within a small radius about the center of the liquid lens 142 is used as an actual light transmission path, unlike the illustration in FIG. 5, the diameter (e.g. $O_3$) of the center area of the third plate 146 may be smaller than the diameter (e.g. $O_2$) of the opening that is larger among the third and fourth openings in the first plate 147.

The insulating layer 148 may be disposed so as to cover a portion of the bottom surface of the second plate 145 in the upper area of the cavity CA. That is, the insulating layer 148 may be disposed between the second liquid LQ2 and the second plate 145.

In addition, the insulating layer 148 may be disposed so as to cover portions of the individual electrodes IE1 and IE2, which form the sidewall of the cavity CA. In addition, the insulating layer 148 may be disposed on the bottom surface of the first plate 147 so as to cover portions of the individual electrodes IE1 and IE2, the first plate 147, and the common electrode CE. Thus, contact between the individual electrodes IE1 and IE2 and the first and second liquids LQ1 and LQ2 may be inhibited by the insulating layer 148.

The insulating layer 148 may be formed of, for example, a coating agent such as parylene C, and may further include a white dye. The white dye may increase the rate of reflection of light from the insulating layer 148, which forms the sidewall i of the cavity CA.

The insulating layer 148 may cover one (e.g. the individual electrodes IE1 and IE2) of the individual electrodes IE1 and IE2 and the common electrode CE, and may expose a portion of the other electrode (e.g. the common electrode CE), so that electric energy is applied to the first liquid LQ1, which is conductive.

Meanwhile, referring again to FIGS. 4A to 4C, the upper cover UC may be disposed so as to surround at least one of the top surface or the side surface of the liquid lens 142. The upper cover UC may include first to fourth outer side surfaces US1 to US4, a top surface UTS, a bottom surface UBS, a first contact surface 400, and an inner side surface 420.

The first and second outer side surfaces US1 and US2 of the upper cover UC may be disposed so as to face each other in a direction perpendicular to the direction of the optical axis LX (e.g. the x-axis direction), and the third and fourth outer side surfaces US3 and US4 may be disposed so as to face each other in a direction perpendicular to the direction of the optical axis LX (e.g. the y-axis direction). The first contact surface 400 may be the surface that is in contact with the lower cover LC.

The upper cover UC may include first to eighth individual terminals ET1 to ET8. Here, although the number of individual terminals ET1 to ET8 is illustrated as being the same as the number of individual electrode sectors E1 to E8, the embodiment is not limited thereto.

In addition, the first to eighth individual terminals ET1 to ET8 may be electrically connected to the first to eighth individual electrode sectors E1 to E8, respectively, and may be exposed in a direction perpendicular to the optical axis LX of the image sensor 182.

In addition, the first to eighth individual terminals ET1 to ET8 may be exposed through at least one of the first or second opening in the holder 120. For example, as shown in FIGS. 4A to 4C, the first, second, third, and eighth individual terminals ET1, ET2, ET3, and ET8 may be exposed through the first opening OP1 in the holder 120, and the fourth to seventh individual terminals ET4 to ET7 may be exposed through the second opening OP2 in the holder 120.

The first to eighth individual terminals ET1 to ET8 may be disposed on at least one of the first, second, third, or fourth outer side surface US1, US2, US3 or US4. For example, as shown in FIGS. 4A to 4C, the first to third, and eighth individual terminals ET1 to ET3, and ET8 may be disposed on the first outer side surface US1. In addition, the fourth to seventh individual terminals ET4 to ET7 may be disposed on the second outer side surface US2.

In addition, the upper cover UC may further include an upper opening UCH, which is disposed near the center of the upper cover UC at a position corresponding to the position of the image sensor 182 in the direction of the optical axis LX or in a second direction (e.g. the z-axis direction) parallel to the optical axis LX. The upper opening UCH may be formed so as to penetrate the top surface UTS and the bottom surface UBS.

Meanwhile, referring again to FIGS. 4A to 4C, the upper cover UC may further include first to eighth upper contact portions UCP1 to UCP8 and first to eighth upper connection portions UCC1 to UCC8.

The first upper contact portion UCP1 may be in electrical contact with the first individual electrode sector E1. The second upper contact portion UCP2 may be in electrical contact with the second individual electrode sector E2. The third upper contact portion UCP3 may be in electrical contact with the third individual electrode sector E3. The fourth upper contact portion UCP4 may be in electrical contact with the fourth individual electrode sector E4. The fifth upper contact portion UCP5 may be in electrical contact with the fifth individual electrode sector E5. The sixth upper contact portion UCP6 may be in electrical contact with the sixth individual electrode sector E6. The seventh upper contact portion UCP7 may be in electrical contact with the seventh individual electrode sector E7. The eighth upper contact portion UCP8 may be in electrical contact with the eighth individual electrode sector E8. To this end, the first to eighth upper contact portions UCP1 to UCP8 may have shapes protruding from the bottom surface UBS of the upper cover UC toward the first to eighth individual electrode sectors E1 to E8, respectively.

In addition, the first upper connection portion UCC1 may electrically connect the first upper contact portion UCP1 to the first individual terminal ET1. The second upper connection portion UCC2 may electrically connect the second upper contact portion UCP2 to the second individual terminal ET2. The third upper connection portion UCC3 may electrically connect the third upper contact portion UCP3 to the third individual terminal ET3. The fourth upper connection portion UCC4 may electrically connect the fourth upper contact portion UCP4 to the fourth individual terminal ET4. The fifth upper connection portion UCC5 may electrically connect the fifth upper contact portion UCP5 to the fifth individual terminal ET5. The sixth upper connection portion UCC6 may electrically connect the sixth upper contact portion UCP6 to the sixth individual terminal ET6. The seventh upper connection portion UCC7 may electrically connect the seventh upper contact portion UCP7 to the seventh individual terminal ET7. The eighth upper connection portion UCC8 may electrically connect the eighth upper contact portion UCP8 to the eighth individual terminal ET8. To this end, the first to eighth upper connection portions UCC1 to UCC8 may be disposed on the surfaces of the upper cover UC, other than the first and second outer side surfaces US1 and US2, on which the first to eighth individual terminals ET1 to ET8 are disposed, and the bottom surface UBS, on which the first to eighth upper contact portions UCP1 to UCP8 are disposed. That is, the first to eighth upper connection portions UCC1 to UCC8 may be disposed on at least one of the top surface UTS, the third outer side surface US3, the fourth outer side surface US4, the inner side surface 420, on which the upper contact portions UCP1 to UCP8 are disposed, or the first contact surface 400 of the upper cover UC.

Accordingly, the first individual electrode sector E1 and the first individual terminal ET1 may be electrically connected to each other through the first upper contact portion UCP1 and the first upper connection portion UCC1. The second individual electrode sector E2 and the second individual terminal ET2 may be electrically connected to each other through the second upper contact portion UCP2 and the second upper connection portion UCC2. The third individual electrode sector E3 and the third individual terminal ET3 may be electrically connected to each other through the third upper contact portion UCP3 and the third upper connection portion UCC3. The fourth individual electrode sector E4 and the first individual terminal ET4 may be electrically connected to each other through the fourth upper contact portion UCP4 and the fourth upper connection portion UCC4. The fifth individual electrode sector E5 and the fifth individual terminal ET5 may be electrically connected to each other through the fifth upper contact portion UCP5 and the fifth upper connection portion UCC5. The sixth individual electrode sector E6 and the sixth individual terminal ET may be electrically connected to each other through the sixth upper contact portion UCP6 and the sixth upper connection portion UCC6. The seventh individual electrode sector E7 and the seventh individual terminal ET7 may be electrically connected to each other through the seventh upper contact portion UCP7 and the seventh upper connection portion UCC7. The eighth individual electrode sector E8 and the eighth individual terminal ET8 may be electrically connected to each other through the eighth upper contact portion UCP8 and the eighth upper connection portion UCC8.

Meanwhile, the lower cover LC may be disposed so as to surround the liquid lens 142 together with the upper cover UC. That is, the lower cover LC may be disposed so as to surround at least one of the bottom surface or the side surface of the liquid lens 142.

The lower cover UC may include first to fourth outer side surfaces LS1 to LS4, a top surface LTS, a bottom surface LBS, a second contact surface 410, and an inner side surface 430. The first and second outer side surfaces LS1 and LS2 of the lower cover LC may be disposed so as to face each other in a direction perpendicular to the direction of the optical axis LX (e.g. the x-axis direction), and the third and fourth outer side surfaces LS3 and LS4 may be disposed so as to face each other in a direction perpendicular to the direction of the optical axis LX (e.g. the y-axis direction). The second contact surface 410 may be a surface that is in contact with the upper cover UC.

Figure 6A:
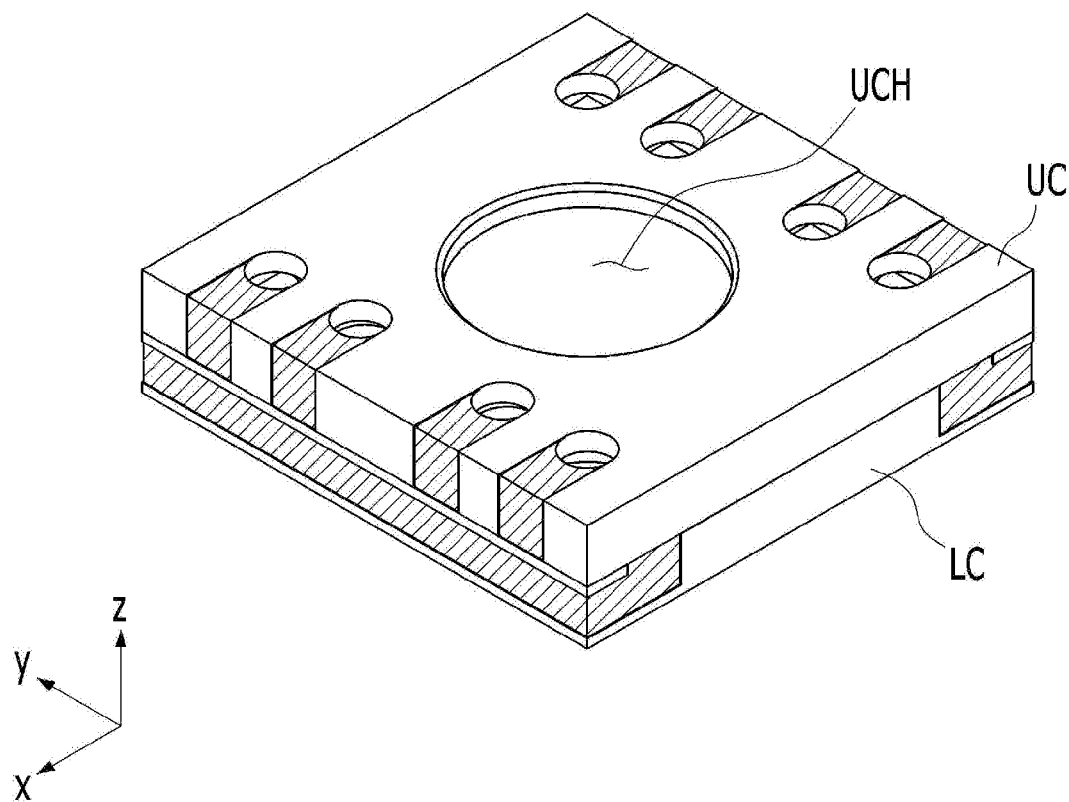
FIG. 6A illustrates a coupled perspective view of a liquid lens module according to another embodiment.
Figure 6B:
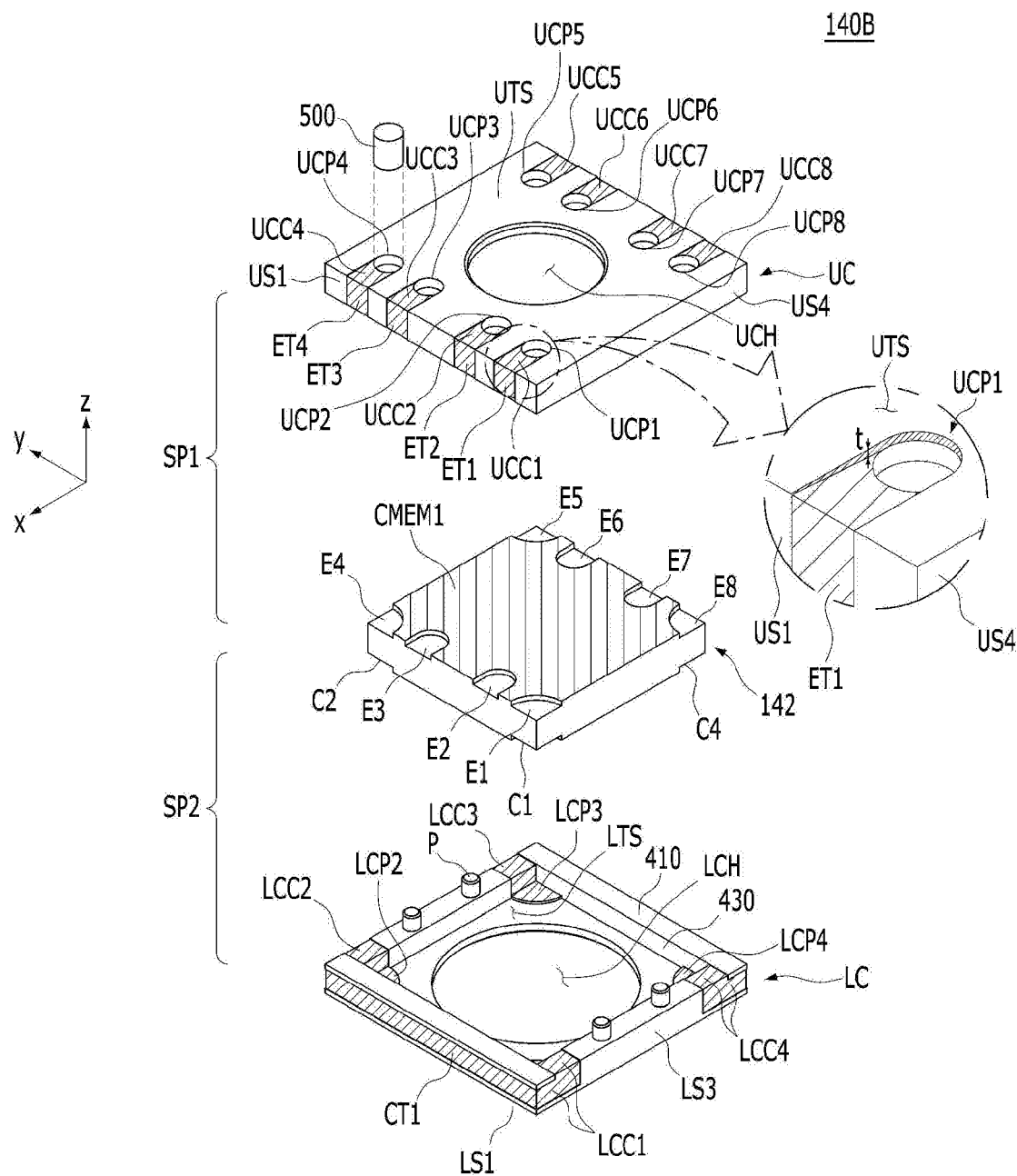
FIG. 6B illustrates an exploded top perspective view of the liquid lens module shown in FIG. 6A.
Figure 6C:
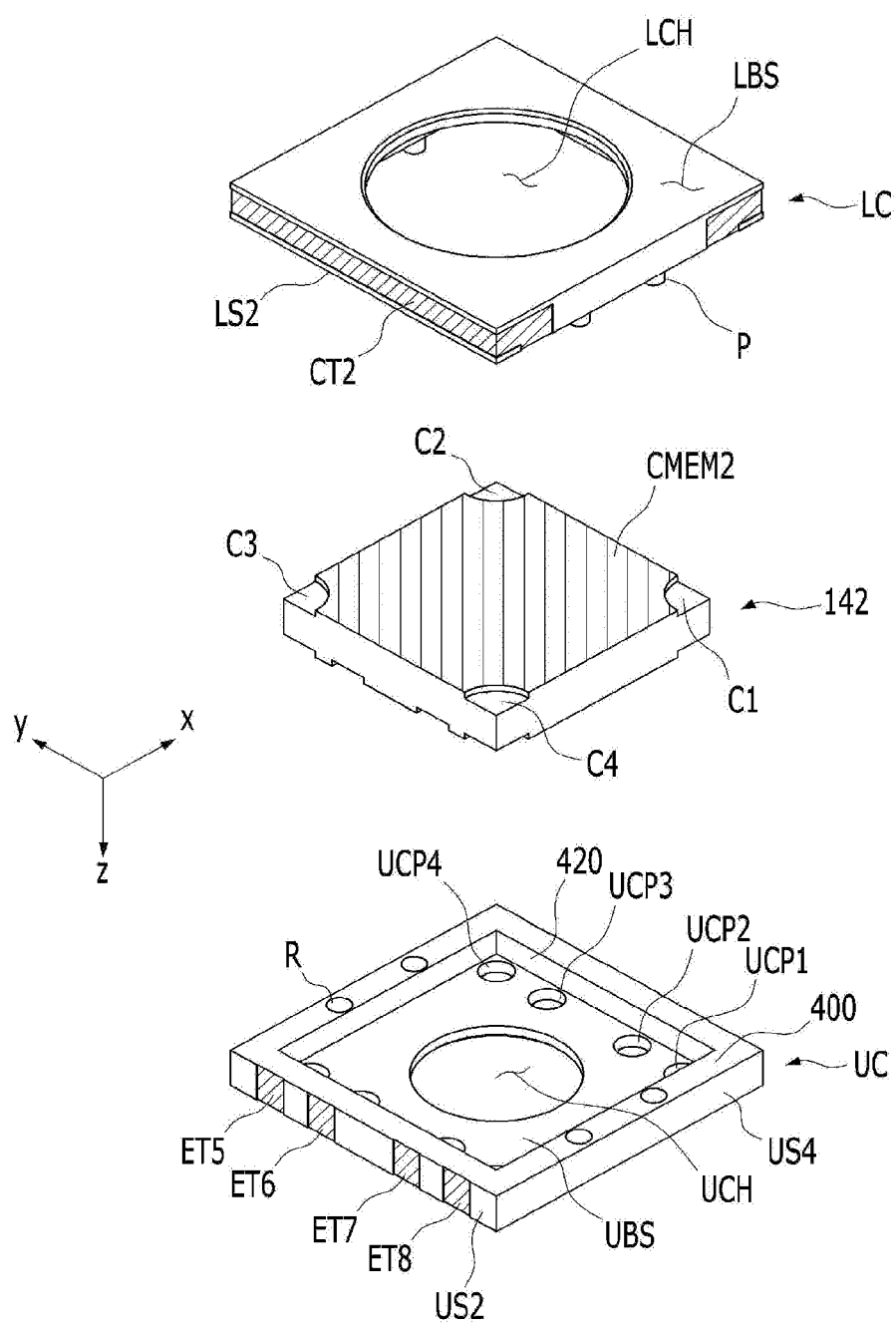
FIG. 6C illustrates an exploded bottom perspective view of the liquid lens module shown in FIG. 6A.

The lower cover LC may include first to $n^{th}$ common terminals. Here, $1 \leq n \leq N$. In the case of FIGS. 4A to 4C, in which n=4, the lower cover LC may include first to fourth common terminals CT1 to CT4. Here, the number of common terminals CT1 to CT4 is illustrated as being the same as the number of common electrode sectors C1 to C4, but the embodiment is not limited thereto. As shown in FIGS. 6A to 6C, which will be described later, the number of common terminals may be two, and the number of common electrode sectors may be four.

In addition, the first to fourth common terminals CT1 to CT4 may be electrically connected to the first to fourth common electrode sectors C1 to C4, respectively, and may be exposed in a direction perpendicular to the optical axis LX of the image sensor 182 (e.g. the x-axis direction). That is, the first to fourth common terminals CT1 to CT4 may be exposed in the same direction as the first to eighth individual terminals ET1 to ET8. As shown in FIGS. 2 and 3, this direction may be the direction in which the liquid lens module 140 is inserted into the first or second opening OP1 or OP2 in the holder 120. Accordingly, the first to fourth common terminals CT1 to CT4 may be exposed through at least one of the first or second opening OP1 or OP2 in the holder 120. For example, as shown in FIGS. 4A to 4C, the first and second common terminals CT1 and CT2 may be exposed through the first opening OP1 in the holder 120, and the third and fourth common terminals CT3 and CT4 may be exposed through the second opening OP2 in the holder 120.

The first to fourth common terminals CT1 to CT4 may be disposed on at least one of the first, second, third or fourth outer side surface LS1, LS2, LS3 or LS4. For example, as shown in FIGS. 4A to 4C, the first and second common terminals CT1 and CT2 may be disposed on the first outer side surface LS1. In addition, the third and fourth common terminals CT3 and CT4 may be disposed on the second outer side surface LS2.

In addition, the lower cover LC may further include a lower opening LCH, which is disposed near the center of the lower cover LC at a position corresponding to the position of the image sensor 182 in the direction of the optical axis LX or in a direction parallel to the optical axis LX (e.g. the z-axis direction). The lower opening LCH may be formed so as to penetrate the top surface LTS and the bottom surface LBS of the lower cover LC, and may overlap the upper cover UCH in the optical-axis direction.

In addition, referring to FIG. 4B, the lower cover LC may further include first to fourth lower contact portions LCP1 to LCP4 and first to fourth lower connection portions LCC1 to LCC4.

The first lower contact portion LCP1 may be in electrical contact with the first common electrode sector C1. The second lower contact portion LCP2 may be in electrical contact with the second common electrode sector C2. The third lower contact portion LCP3 may be in electrical contact with the third common electrode sector C3. The fourth lower contact portion LCP4 may be in electrical contact with the fourth common electrode sector C4. To this end, the first to fourth lower contact portions LCP1 to LCP4 may have shapes protruding from the top surface LTS of the lower cover LC toward the first to fourth common electrode sectors C1 to C4, respectively.

In addition, the first lower connection portion LCC1 may electrically connect the first lower contact portion LCP1 to the first common terminal CT1. In addition, the second lower connection portion LCC2 may electrically connect the second lower contact portion LCP2 to the second common terminal CT2. In addition, the third lower connection portion LCC3 may electrically connect the third lower contact portion LCP3 to the third common terminal CT3. In addition, the fourth lower connection portion LCC4 may electrically connect the fourth lower contact portion LCP4 to the fourth common terminal CT4. To this end, the first to fourth lower connection portions LCC1 to LCC4 may be disposed on the surfaces of the lower cover LC, other than the bottom surface LBS, the third outer side surface LS3, the fourth outer side surface LS4, the first and second outer side surfaces LS1 and LS2, on which the first to fourth common terminals CT1 to CT4 are disposed, and the top surface LTS, on which the first to fourth lower contact portions LCP1 to LCP8 are disposed. That is, the first to fourth lower connection portions LCC1 to LCC4 may be disposed on at least one of the second contact surface 410 or the inner side surface 430 of the lower cover LC.

Accordingly, the first common electrode sector C1 and the first common terminal CT1 may be electrically connected to each other through the first lower contact portion LCP1 and the first lower connection portion LCC1. The second common electrode sector C2 and the second common terminal CT2 may be electrically connected to each other through the second lower contact portion LCP2 and the second lower connection portion LCC2. The third common electrode sector C3 and the third common terminal CT3 may be electrically connected to each other through the third lower contact portion LCP3 and the third lower connection portion LCC3. The fourth common electrode sector C4 and the fourth common terminal CT4 may be electrically connected to each other through the fourth lower contact portion LCP4 and the fourth lower connection portion LC C4.

In addition, as shown in FIGS. 4B and 4C, the upper cover UC may include a plurality of recesses R formed in the first contact surface 400, and the lower cover LC may include a plurality of protrusions P protruding from the second contact surface 410 at positions corresponding to the positions of the recesses R and having a shape corresponding to the shape of the recesses R.

In contrast, unlike the illustration in FIGS. 4B and 4C, the upper cover UC may include a plurality of protrusions P protruding from the first contact surface 400, and the lower cover LC may include a plurality of recesses R formed in the second contact surface 410 at positions corresponding to the positions of the protrusions and having a shape corresponding to the shape of the protrusions.

The upper cover UC and the lower cover LC may be coupled to each other in various manners. For example, the upper cover UC and the lower cover LC may be coupled to each other by inserting the protrusions P into the recesses R, or may be coupled to each other using an adhesive. However, the embodiment is not limited as to a specific method of coupling the upper cover UC and the lower cover LC to each other.

In addition, the upper cover UC and the lower cover LC may be aligned with each other using the protrusions P and the recesses R.

In addition, each of the upper cover UC and the lower cover LC may be formed of an insulating material.

FIG. 6A illustrates a coupled perspective view of a liquid lens module 140B according to another embodiment, FIG. 6B illustrates an exploded top perspective view of the liquid lens module 140B shown in FIG. 6A, and FIG. 6C illustrates an exploded bottom perspective view of the liquid lens module 140B shown in FIG. 6A.

In the following description of the liquid lens module 140B shown in FIGS. 6A to 6C, only parts different from those of the liquid lens module 140A shown in FIGS. 4A to 4C will be described. Therefore, with regard to undescribed parts of the liquid lens module 140B shown in FIGS. 6A to 6C, the description of the liquid lens module 140A shown in FIGS. 4A to 4C may be applied thereto.

Referring to FIG. 6B, an upper cover UC may include first to eighth upper contact portions UCP1 to UCP8 and first to eighth upper connection portions UCC1 to UCC8.

The first to eighth upper contact portions UCP1 to UCP8 may be in electrical contact with the first to eighth individual electrode sectors E1 to E8, respectively. To this end, the first to eighth upper contact portions UCP1 to UCP8 may include first to eighth contact through-holes and first to eighth conductive members (e.g. 500). The first to eighth contact through-holes may be formed at positions corresponding to the positions of the first to eighth individual electrode sectors E1 to E8, respectively. The first to eighth conductive members 500 may be embedded in the first to eighth contact through-holes, respectively, and may electrically connect the first to eighth individual electrode sectors E1 to E8 to the first to eighth upper connection portions UCC1 to UCC8, respectively. Each of the first to eighth conductive members 500 may be epoxy including metal (e.g. Ag), but the embodiment is not limited thereto.

In addition, as shown inside the circular dotted line in FIG. 6B, each contact through-hole may be formed at a position located downwards by a predetermined depth (e.g. t) from the top surface UTS of the upper cover UC. This is to accommodate the portion of the conductive member 500 that overflows out of the contact through-hole, if any, when the conductive member 500 is imbedded into the contact through-hole.

In addition, the first to eighth upper connection portions UCC1 to UCC8 may connect the first to eighth upper contact portions UCP1 to UCP8 to the first and eight individual terminals ET1 to ET8, respectively. To this end, the first to eighth upper connection portions UCC1 to UCC8 may be disposed on the top surface UTS of the upper cover UC.

The lower cover LC may include first and second common terminals CT1 and CT2. The case shown in FIGS. 6A to 6C is the case of n=2. Here, the number (n=2) of common terminals CT1 and CT2 is smaller than the number (N=4) of common electrode sectors C1 to C4. This is because each of the first and second common terminals CT1 and CT2 is electrically connected to a respective one of the lower contact portions adjacent thereto among the first to fourth lower contact portions LCP1 to LCP4.

For example, the first common terminal CT1 is electrically connected to the first lower connection portion LCC1 and the second lower connection portion LCC2, and the second common terminal CT2 is electrically connected to the third lower connection portion LCC3 and the fourth lower connection portion LCC4. As such, among the first to fourth lower contact portions LCP1 to LCP4, two neighboring lower contact portions LCP1 and LCP2 or LCP3 and LCP4 may share a single common terminal. Here, the number n of common terminals may be half the number N of common electrode sectors.

In addition, the first and second common terminals CT1 and CT2 may be exposed in a direction perpendicular to the optical axis LX of the image sensor 182 (e.g. the x-axis direction). That is, the first and second common terminals CT1 and CT2 may be exposed in the same direction as the first to eighth individual terminals ET1 to ET8.

In addition, the first and second common terminals CT1 and CT2 may be exposed through at least one of the first or second opening in the holder 120. For example, as shown in FIGS. 6A to 6C, the first common terminal CT1 may be exposed together with the first to fourth individual terminals ET1 to ET4 through the first opening OP1 in the holder 120, and the second common terminal CT2 may be exposed together with the fifth to eighth individual terminals ET5 to ET8 through the second opening OP2 in the holder 120.

The first and second common terminals CT1 and CT2 may be disposed on at least one of the first, second, third or fourth outer side surfaces LS1, LS2, LS3 and LS4. For example, as shown in FIGS. 6A to 6C, the first common terminal CT1 may be disposed on the first outer side surface LS1, and the second common terminal CT2 may be disposed on the second outer side surface LS2.

In addition, the first to fourth lower connection portions LCC1 to LCC4 may connect the first to fourth lower contact portions LCP1 to LCP4 to the first to fourth common terminals CT1 to CT4, respectively. To this end, the first to fourth lower connection portions LCC1 to LCC4 may be disposed on the surfaces of the lower cover LC other than the top surface LTS, the bottom surface LBS, and the outer side surfaces (e.g. LS1 and LS2), on which the first and second common terminals CT1 and CT2 are disposed. That is, the first to fourth lower connection portions LCC1 to LCC4 may be disposed on at least one of the second contact surface 410, the inner side surface 430, the third outer side surface LS3, or the fourth outer side surface LS4 of the lower cover LC.

Figure 7A:
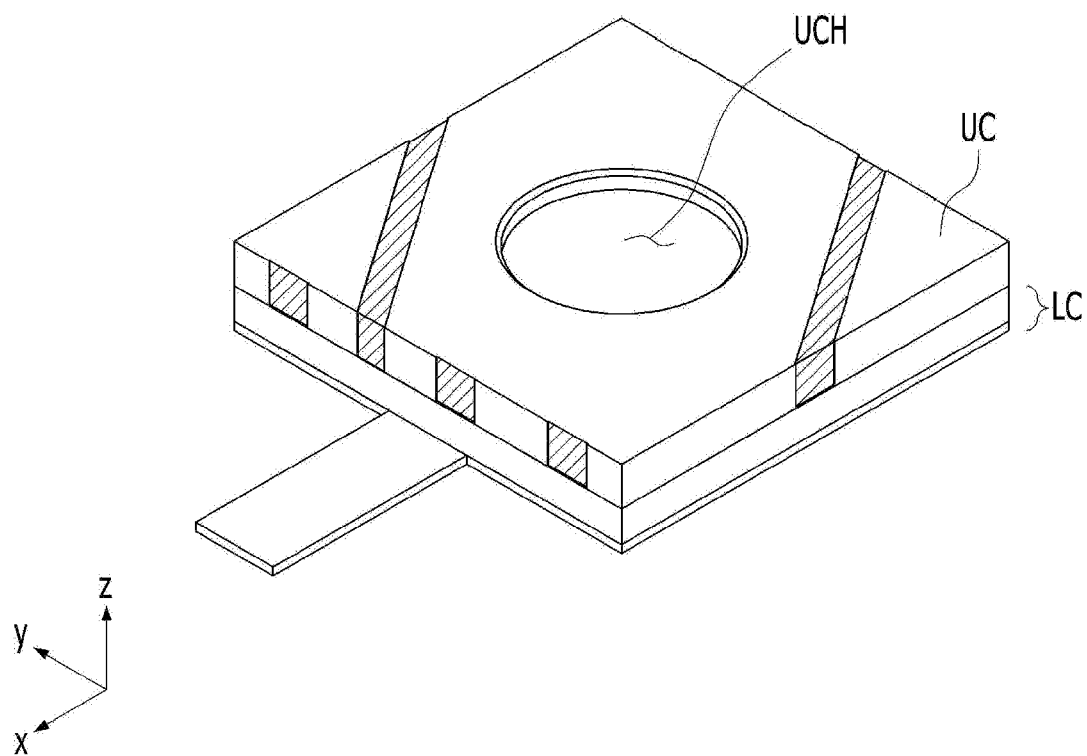
FIG. 7A illustrates a coupled perspective view of a liquid lens module according to still another embodiment.
Figure 7B:
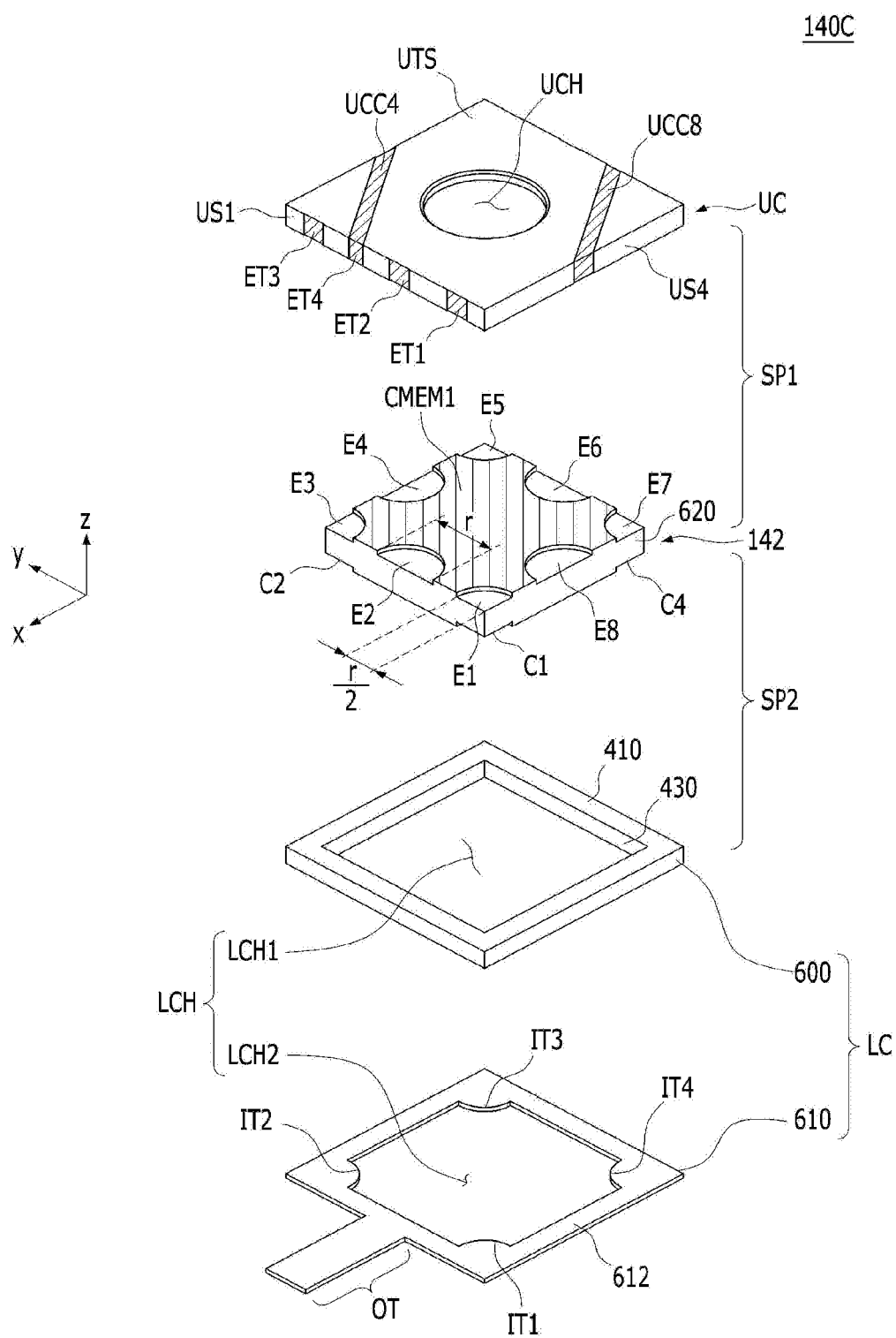
FIG. 7B illustrates an exploded top perspective view of the liquid lens module shown in FIG. 7A.
Figure 7C:
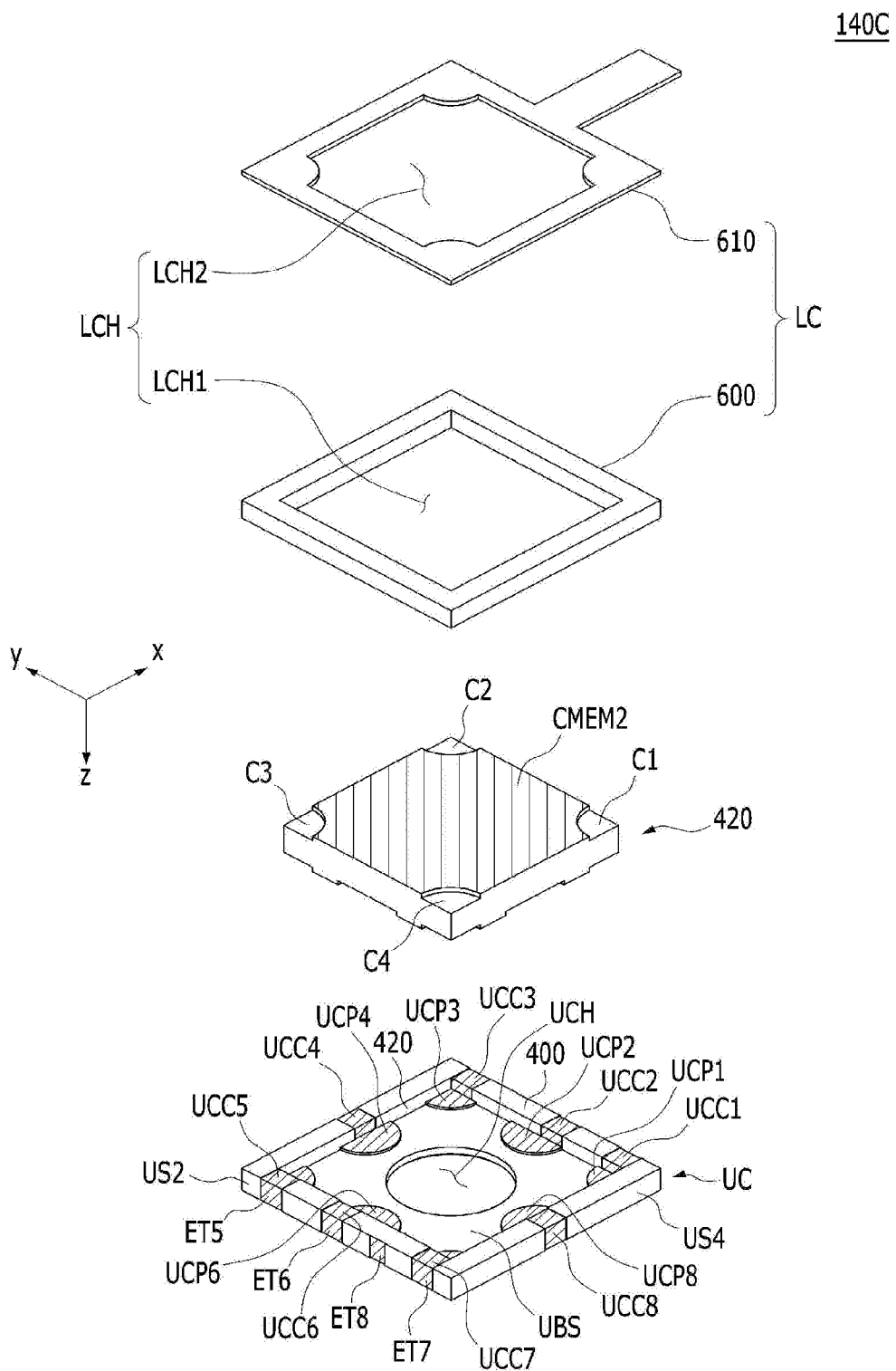
FIG. 7C illustrates an exploded bottom perspective view of the liquid lens module shown in FIG. 7A.

FIG. 7A illustrates a coupled perspective view of a liquid lens module 140C according to still another embodiment, FIG. 7B illustrates an exploded top perspective view of the liquid lens module 140C shown in FIG. 7A, and FIG. 7C illustrates an exploded bottom perspective view of the liquid lens module 140C shown in FIG. 7A.

In the following description of the liquid lens module 140C shown in FIGS. 7A to 7C, only parts different from those of the liquid lens module 140A shown in FIGS. 4A to 4C will be described. Therefore, with regard to undescribed parts of the liquid lens module 140C shown in FIGS. 7A to 7C, the description of the liquid lens module 140A shown in FIGS. 4A to 4C may be applied thereto.

In FIG. 7B, the planar areas of the individual electrode sectors E1 to E8 may be the same as or different from each other. For example, the width r/2 of the first, third, fifth and seventh individual electrode sectors E1, E3, E5 and E7 in the y-axis direction may be smaller than the width r of the second, fourth, sixth and eighth individual electrode sectors E2, E4, E6 and E8 in the y-axis direction.

The lower cover UC may include a cover frame 600 and a connection substrate 610.

The cover frame 600 may be disposed so as to surround the side portion 620 of the liquid lens 142, and may be disposed between the upper cover UC and the connection substrate 610.

The connection substrate 610 may be disposed so as to surround the liquid lens 142 together with the cover frame 600, and may include a common terminal OT connected to the first to fourth common electrode sectors C1 to C4. For example, the connection substrate 610 may be disposed under the cover frame 600, and may be disposed so as to surround the liquid lens 142 together with the cover frame 600. The connection substrate 610 may have a plate shape. The plate may be metal.

The connection substrate 610 may include a substrate frame 612, an outer terminal OT, and first to fourth inner protrusions IT1 to IT4.

The outer terminal OT may protrude from the outer side of the substrate frame 612 in the first direction (the x-axis direction), and may perform the same function as the common terminal CT1, CT2, CT3 or CT4 shown in FIGS. 4A to 4C or FIGS. 6A to 6C.

The first to fourth inner terminals IT1 to IT4 may protrude from the inner side of the substrate frame 612, and may be disposed so as to be in contact with the first to fourth common electrode sectors C1 to C4, respectively.

In addition, the common terminal OT may be electrically connected to the first to fourth common electrode sectors C1 to C4 through the substrate frame 612. Therefore, the number 'n' of common terminals OT of the lower cover LC may be one, that is, smaller than the number 'N' of common electrode sectors C1 to C4. The common terminal OT may be exposed in a direction perpendicular to the optical axis LX of the image sensor 182 (e.g. the x-axis direction). That is, the common terminal OT may be disposed in the same direction as the first to eighth individual terminals ET1 to ET8.

In addition, the common terminal OT may be exposed through at least one of the first or second opening in the holder 120. For example, as shown in FIGS. 7A to 7C, the common terminal OT may be exposed together with the first to eighth individual terminals ET1 to ET8 through the first opening OP1 in the holder 120.

In addition, the lower cover LC may further include a lower opening LCH, which is disposed at a position corresponding to the position of the image sensor 182 in the direction of the optical axis LX or in a direction parallel to the optical axis LX (e.g. the z-axis direction). The lower opening LCH may include first and second lower openings LCH1 and LCH2. The first lower opening LCH1 may be formed near the center of the cover frame 600 at a position corresponding to the position of the image sensor 182 in the direction of the optical axis LX or in a direction parallel to the optical axis LX (e.g. the z-axis direction), and the second lower opening LCH2 may be formed near the center of the connection substrate 610 at a position corresponding to the position of the image sensor 182 in the direction of the optical axis LX or in a direction parallel to the optical axis LX (e.g. the z-axis direction). The first and second lower openings LCH1 and LCH2 may be disposed so as to overlap each other in the direction of the optical axis LX or in a direction parallel to the optical axis LX (e.g. the z-axis direction).

The upper cover UC and the lower cover LC may be coupled to each other in various manners. For example, the upper cover UC and the cover frame 600 of the lower cover LC may be coupled to each other using an adhesive.

Meanwhile, the first to eighth individual terminals ET1 to ET8 and the first to fourth common terminals CT1 to CT4 described above may be electrically connected to the main board 150 in various manners. For example, the first to eighth individual terminals ET1 to ET8 and the first to fourth common terminals CT1 to CT4 may be electrically connected to the main board 150 using conductive epoxy (e.g. Ag), soldering, or wire bonding. That is, the main board 150 may supply a driving voltage to the liquid lens 142 through the first to eighth individual terminals ET1 to ET8 and the first to fourth common terminals CT1 to CT4.

In addition, the first to eighth upper connection portions UCC1 to UCC8 described above may be coupled to, in contact with, or disposed in the upper cover UC in various manners, and the first to fourth lower connection portions LCC1 to LCC4 described above may be coupled to, in contact with, or disposed in the lower cover LC in various manners.

When a driving voltage is applied through the first to eighth individual terminals ET1 and ET8 and the first to fourth common terminals CT1 to CT4, the interface BO between the first liquid LQ1 and the second liquid LQ2 may be deformed, and thus at least one of the shape, such as a curvature, or the focal length of the liquid lens 142 may be changed (or adjusted). For example, the focal length of the liquid lens 142 may be adjusted as at least one of the flexure or the inclination of the interface BO formed in the liquid lens 142 is changed according to the driving voltage. When the deformation or the radius of curvature of the interface BO is controlled, the liquid lens 142, the lens assembly 110, 120, 130 and 140 including the liquid lens 142, the camera module 100, and the optical device may perform an AF function and an OIS function.

The first to eighth individual terminals ET1 to ET8 may transmit eight different driving voltages (hereinafter, referred to as 'individual voltages') to the liquid lens 142, and the first to fourth common terminals CT1 to CT4 may transmit a driving voltage (hereinafter, referred to as a 'common voltage') to the liquid lens 142. The common voltage may include DC voltage or AC voltage, and when the common voltage is applied in the form of a pulse, the width or duty cycle of the pulse may be constant.

In addition, the liquid lens module 140A, 140B or 140C may further include at least one of first or second adhesive member CMEM1 or CMEM2. The first adhesive member CMEM1 may be disposed in a first space SP1 between the upper cover UC and the liquid lens 142, and the second adhesive member CMEM2 may be disposed in a second space SP2 between the lower cover LC and the liquid lens 142. In this case, the first adhesive member CMEM1 may not be disposed at a position overlapping the upper opening UCH and the lower opening LCH in the optical-axis direction or above the individual electrode pads E1 to E8. The second adhesive member CMEM2 may overlap the upper opening UCH and the lower opening LCH in the optical-axis direction.

For example, the first and second adhesive members CMEM1 and CMEM2 may be attached to the top surface and the bottom surface of the liquid lens 142, respectively, in the form of a film, or may be disposed on the same in the form of a paste, but the embodiment is not limited thereto.

Figure 8:
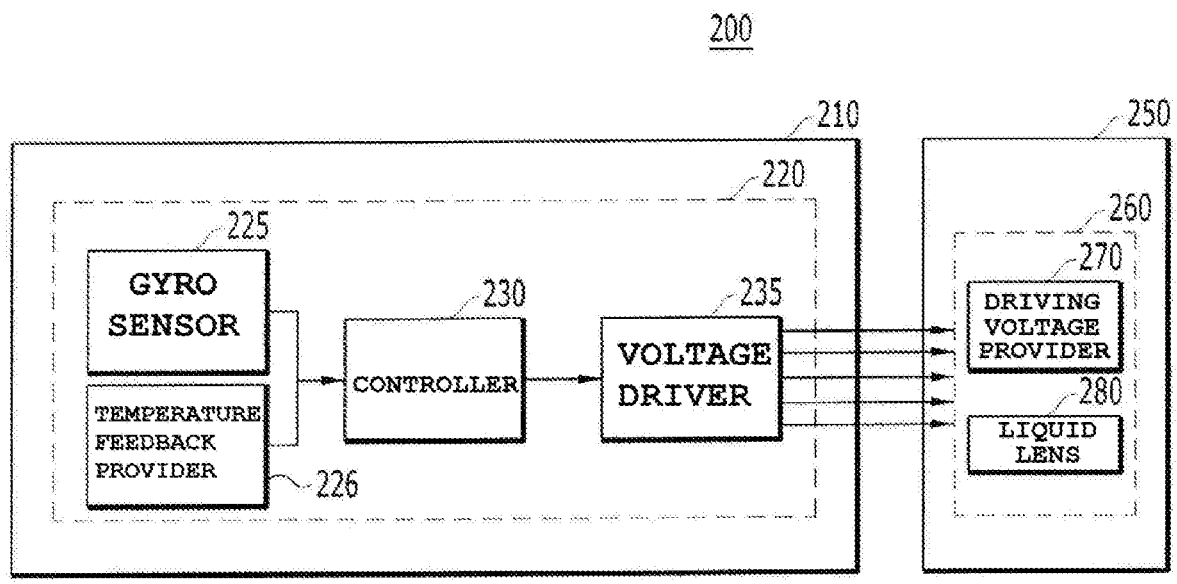
FIG. 8 is a schematic block diagram of the camera module.

FIG. 8 is a schematic block diagram of the camera module 200.

Referring to FIG. 8, the camera module 200 may include a control circuit 210 and a lens assembly 250. The control circuit 210 may correspond to the control circuit 24 shown in FIG. 1 or the main board 150 shown in FIG. 2, and the lens assembly 250 may correspond to the lens assembly 22 shown in FIG. 1 or the lens assembly 110, 120, 130 and 140 shown in FIG. 2.

The control circuit 210 may include a control unit 220, and may control the operation of the liquid lens module 140 including a liquid lens 280.

The control unit 220 may have a component for performing an AF function and an OIS function, and may control the liquid lens 280 included in the lens assembly 250 using a user request or a sensed result (e.g. a motion signal of a gyro sensor 225). Here, the liquid lens 280 may correspond to the above-described liquid lens 142.

The control unit 220 may include a gyro sensor 225, a controller 230, and a voltage driver 235. The gyro sensor 225 may be an independent component that is not included in the control unit 220, or may be included in the control unit 220.

The gyro sensor 225 may sense the angular velocity of movement in two directions, including a yaw-axis direction and a pitch-axis direction, in order to compensate for hand tremor in the vertical and horizontal directions of the optical device. The gyro sensor 225 may generate a motion signal corresponding to the sensed angular velocity, and may provide the motion signal to the controller 230.

The controller 230 may remove a high frequency noise component from the motion signal using a low-pass filter (LPF) so as to extract only a desired frequency band for implementation of an OIS function, may calculate the amount of hand tremor using the motion signal from which the noise has been removed, and may calculate a driving voltage corresponding to the shape that the liquid lens 280 of the liquid lens module 260 needs to have in order to compensate for the calculated amount of hand tremor.

The controller 230 may receive information for an AF function (i.e. information on the distance to an object) from an internal component (e.g. an image sensor 182) or an external component (e.g. a distance sensor or an application processor) of the optical device or the camera module 200, and may calculate the driving voltage corresponding to the desired shape of the liquid lens 280 based on a focal length, which is required to focus on the object, using the di stance information.

The controller 230 may store a driving voltage table in which a driving voltage and a driving voltage code for making the voltage driver 235 generate the driving voltage are mapped, may acquire the driving voltage code corresponding to the calculated driving voltage by referring to the driving voltage table, and may output the acquired driving voltage code to the voltage driver 235.

The voltage driver 235 may generate a driving voltage in an analog form, which corresponds to the driving voltage code, based on a driving voltage code in a digital form provided from the controller 230, and may provide the driving voltage to the lens assembly 250.

The voltage driver 235 may include a voltage booster, which increases a voltage level upon receiving a supply voltage (e.g. a voltage supplied from a separate power supply circuit), a voltage stabilizer for stabilizing the output of the voltage booster, and a switching unit for selectively supplying the output of the voltage booster to each terminal of the liquid lens 280.

Here, the switching unit may include a circuit component called an H bridge. A high voltage output from the voltage booster is applied as a power supply voltage of the switching unit. The switching unit may selectively supply the applied power supply voltage and a ground voltage to opposite ends of the liquid lens 280. Here, as described above, the liquid lens 280 includes eight individual electrode sectors E1 to E8 and four common electrode sectors C1 to C4 for driving. Opposite ends of the liquid lens 280 may mean any one of the first to eighth individual electrode sectors E1 to E8 and an arbitrary one of the four common electrode sectors C1 to C4. A pulse-type voltage having a predetermined width may be applied to each electrode sector of the liquid lens 280, and the driving voltage applied to the liquid lens 280 is the difference between the voltages applied to the individual electrodes and the common electrode.

In addition, in order to allow the voltage driver 235 to control the driving voltage applied to the liquid lens 280 depending on a driving voltage code in a digital form provided from the controller 230, the voltage booster may control an increase in a voltage level, and the switching unit may control the phase of a pulse voltage applied to the common electrode and the individual electrodes so as to generate a driving voltage in an analog form, which corresponds to the driving voltage code.

That is, the control unit 220 may control the voltage applied to each of the individual electrodes and the common electrode.

The control circuit 210 may further include a connector (not shown), which performs a communication or interface function of the control circuit 210. For example, the connector may perform communication protocol conversion for communication between the control circuit 210, which uses an inter-integrated circuit (I²C) communication method, and the lens assembly 250, which uses a mobile industry processor interface (MIPI) communication method. In addition, the connector may receive power from an external source (e.g. a battery), and may supply power required for the operation of the control unit 220 and the lens assembly 250. In this case, the connector may correspond to the connector 153 shown in FIG. 2.

The lens assembly 250 may include the liquid lens module 260, and the liquid lens module 260 may include a driving voltage provider 270 and the liquid lens 280.

The driving voltage provider 270 may receive a driving voltage from the voltage driver 235, and may provide the driving voltage to the liquid lens 280. The driving voltage provider 270 may include a voltage adjustment circuit (not shown) or a noise removal circuit (not shown) for compensating for loss due to terminal connection between the control circuit 210 and the lens assembly 250, or may divert the voltage provided from the voltage driver 235 to the liquid lens 280.

The driving voltage provider 270 may be disposed on an FPCB (or a substrate), which constitutes at least a portion of the connection part 152, but the embodiment is not limited thereto. The connection part 152 may include the driving voltage provider 270.

The liquid lens 280 may be deformed in the interface BO thereof between the first liquid LQ1 and the second liquid LQ2 depending on a driving voltage, thereby performing at least one of an AF function or an OIS function.

The upper cover UC and the lower cover LC of the liquid lens module 140A or 140B according to the above-described embodiment and the upper cover UC of the liquid lens module 140C according to the embodiment may be implemented by a laser direct structuring (LDS) method, and the lower cover LC of the liquid lens module 140C may be implemented in an insert mold type, but the embodiment is not limited as to a specific method of implementing the liquid lens modules 140A, 140B and 140C.

Hereinafter, a liquid lens module according to a comparative example and the liquid lens module according to the embodiment will be compared with reference to the accompanying drawings.

Figure 9:
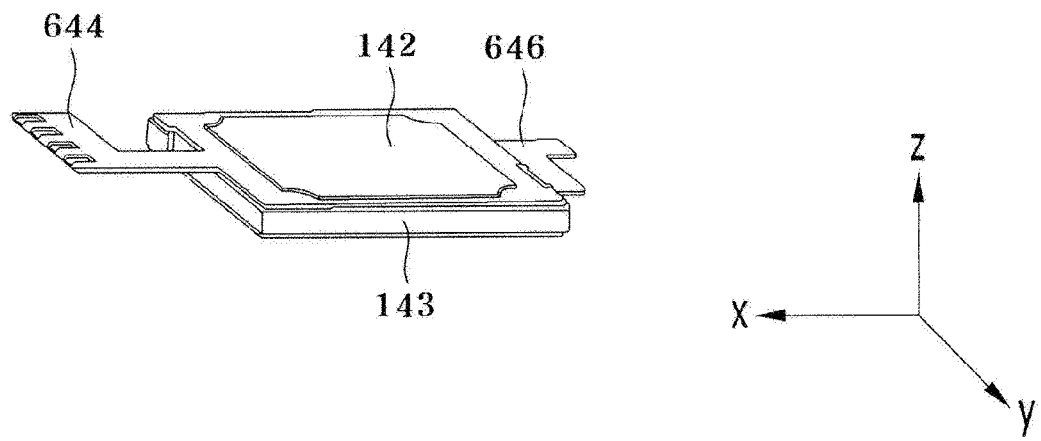
FIG. 9 illustrates a top perspective view of a liquid lens module according to a comparative example.

FIG. 9 illustrates a top perspective view of a liquid lens module according to a comparative example.

The liquid lens module according to the comparative example shown in FIG. 9 may include a liquid lens 142, first and second connection substrates 644 and 646, and a spacer 143. Since the liquid lens 142 corresponds to the liquid lens 142 according to the embodiment, the same reference numeral is used to indicate the same. A driving voltage supplied from a main board (which corresponds to the main board 150 of the embodiment) may be provided to the liquid lens 142 through the first connection substrate 644 and the second connection substrate 646. That is, an individual voltage may be provided to an individual electrode sector through the first connection substrate 644, and a common voltage may be provided to the individual electrode sector through the second connection substrate 646. In addition, the spacer 143 is disposed so as to surround the liquid lens 142. However, it is difficult to protect the upper portion and the lower portion of the liquid lens 142, which are exposed outside, from external impacts.

While the liquid lens module according to the comparative example shown in FIG. 9 includes the first and second connection substrates 644 and 646 and the spacer 143, in addition to the liquid lens 142, the liquid lens module 140A or 140B according to the embodiment shown in FIGS. 4A to 4C or FIGS. 6A to 6C includes the upper cover UC and the lower cover LC, in addition to the liquid lens 142, but does not include the first and second connection substrates 644 and 646 or the spacer 143. In addition, the liquid lens module 140C according to the embodiment shown in FIGS.

7A to 7C includes the upper cover UC, the cover frame 600, and the connection substrate 610, in addition to the liquid lens 142, but does not include the first connection substrate 644 or the spacer 143. This is because the cover frame 600 and the connection substrate 610 serve as the spacer 143 and the first to $M^{th}$ individual terminals ET1 to ETM serve as the first connection substrate 644. As such, the number of components of the liquid lens module 140A, 140B or 140C according to the embodiment may be smaller than the number of components of the liquid lens module according to the comparative example, and the number of items to be managed may be reduced.

In addition, because the liquid lens module according to the comparative example has a large number of components, an accumulated tolerance may be generated, and thus a defect rate may increase. However, because the liquid lens module 140A, 140B or 140C according to the embodiment has a smaller number of components than the comparative example, the number and duration of manufacturing processes may be reduced, no accumulated tolerance may be generated, and a defect rate may be reduced. For example, when the liquid lens module according to the embodiment is manufactured, the manufacturing time required for UV curing or thermal curing may be reduced to, for example, 1 hour.

In addition, in the case of the liquid lens module according to the comparative example, although the side portion of the liquid lens 142 is protected by the spacer 143, the upper portion and the lower portion thereof may be exposed to the outside and may be vulnerable to impacts. On the other hand, in the case of the liquid lens module 140A or 140B according to the embodiment, the upper portion and the side portion of the liquid lens 142 may be sealed by the upper cover UC and the lower cover LC so as not to be exposed outside, and in the case of the liquid lens module 140C according to the embodiment, the upper portion of the liquid lens 142 may be inhibited from being exposed outside by the upper cover UC, thereby exhibiting higher resistance to external impacts than the comparative example shown in FIG. 9.

In addition, in the case of the liquid lens module according to the comparative example, the individual tolerances of the components are large. For example, when the liquid lens 142 is connected to the main board by bending the first and second connection substrates 644 and 646, the individual tolerances between the first and second connection substrates 644 and 646, which are bent, and the main board or the individual tolerances between the first and second connection substrates 644 and 646 and the liquid lens 142 may increase, which may frequently cause a contact problem. On the other hand, in the case of the liquid lens modules 140A to 140C according to the embodiments, since the supply voltage supplied from the main board 150 is provided to the liquid lens 142 through the first to $M^{th}$ individual terminals ET1 to ET8 and the first to $N^{th}$ common terminals (e.g. CT1 to CT4), the individual tolerances may be smaller than those in the comparative example, thus inhibiting the occurrence of a contact problem. For example, when the upper cover UC and the lower cover LC are formed of plastic, which is insulative, a plastic injection tolerance may be very small, for example, may range from −0.02 to 0.03 or from 0.02 to 0.03.

In addition, in the case of the liquid lens module according to the comparative example, mass production is difficult due to the unstable structure thereof. On the other hand, in the case of the liquid lens module according to the embodiment, mass production is possible due to the stable structure thereof, in which the upper cover UC and the lower cover LC cover the liquid lens module 142.

In addition, when the liquid lens module according to the comparative example is inserted into the holder 120 shown in FIGS. 2 and 3, the liquid lens module inserted into the holder 120 is not exposed in the y-axis direction. Therefore, in the case of the liquid lens module according to the comparative example, when the number of individual electrode sectors is greater than 4, the individual electrode sectors may not be used. On the other hand, in the case of the liquid lens module according to the embodiment, even when the number of individual electrode sectors is greater than 4, for example, 8, electrical connection with the main board 150 may be facilitated.

In addition, according to the embodiment, when active alignment is performed by supplying driving voltages to the first to $M^{th}$ individual terminals ET1 to ET8 and the first to $N^{th}$ common terminals (e.g. CT1 to CT4), contact may be facilitated. For example, the first and second outer side surfaces US1 and US2 of the upper cover UC may be held in order to perform active alignment.

An optical device may be implemented using the camera module 100 including the lens assembly according to the embodiment described above. Here, the optical device may include a device that may process or analyze optical signals. Examples of the optical device may include camera/video devices, telescopic devices, microscopic devices, an interferometer, a photometer, a polarimeter, a spectrometer, a reflectometer, an auto-collimator, and a lens-meter, and the embodiments may be applied to optical devices that may include a lens assembly.

In addition, the optical device may be implemented in a portable device such as, for example, a smartphone, a laptop computer, or a tablet computer. Such an optical device may include the camera module 100, a display unit (not shown) configured to output an image, a battery (not shown) configured to supply power to the camera module 100, and a body housing in which the camera module 100, the display unit, and the battery are mounted. The optical device may further include a communication module, which may communicate with other devices, and a memory unit, which may store data. The communication module and the memory unit may also be mounted in the body housing.

Although only a limited number of embodiments have been described above, various other embodiments are possible. The technical contents of the above-described embodiments may be combined into various forms as long as they are not incompatible with one another, and thus may be implemented in new embodiments.

It will be apparent to those skilled in the art that various changes in form and details may be made without departing from the spirit and essential characteristics of the disclosure set forth herein. Accordingly, the above detailed description is not intended to be construed to limit the disclosure in all aspects and to be considered by way of example. The scope of the disclosure should be determined by reasonable interpretation of the appended claims and all equivalent modifications made without departing from the disclosure should be included in the following claims.

MODE FOR INVENTION

Various embodiments have been described in the best mode for carrying out the disclosure.

INDUSTRIAL APPLICABILITY

A liquid lens module, a lens assembly including the same, and a camera module including the lens assembly according to embodiments may be used in camera/video devices, telescopic devices, microscopic devices, an interferometer, a photometer, a polarimeter, a spectrometer, a reflectometer, an auto-collimator, a lens-meter, a smartphone, a laptop computer, a tablet computer, etc.

The invention claimed is:

1. A liquid lens module, comprising:
a liquid lens comprising first to $M^{th}$ individual electrode sectors (where "M" is a positive integer of 2 or greater) and first to $N^{th}$ common electrode sectors (where "N" is a positive integer of 1 or greater);
an upper cover comprising first to $M^{th}$ individual terminals electrically connected to the first to $M^{th}$ individual electrode sectors, respectively, and exposed in a first direction perpendicular to an optical axis of an image sensor; and
a lower cover configured to surround the liquid lens together with the upper cover, the lower cover comprising first to $M^{th}$ common terminals (where $1 \leq n \leq N$) electrically connected to the first to $N^{th}$ common electrode sectors, respectively, and exposed in the first direction;
wherein the upper cover comprises first and second outer side surfaces disposed so as to face each other in the first direction,
wherein one of the first to $M^{th}$ individual terminals is disposed on the first outer side surface and another one of the first to $M^{th}$ individual terminals is disposed on the second outer side surface,
wherein the upper cover comprises:
the first to $M^{th}$ upper contact portions disposed to be in electrical contact with the first to $M^{th}$ individual electrode sectors, respectively; and
first to $M^{th}$ upper connection portions electrically connecting the first to $M^{th}$ upper contact portions to the first to $M^{th}$ individual terminals, respectively, and wherein the first to $M^{th}$ upper contact portions comprise:
first to $M^{th}$ contact through-holes formed at positions respectively corresponding to the first to $M^{th}$ individual electrode sectors; and
first to $M^{th}$ conductive members embedded in the first to $M^{th}$ contact through-holes, the first to $M^{th}$ conductive members electrically connecting the first to $M^{th}$ individual electrode sectors to the first to $M^{th}$ upper connection portions, respectively.

2. The liquid lens module according to claim 1, wherein the lower cover comprises:
first to $N^{th}$ lower contact portions disposed to be in electrical contact with the first to $N^{th}$ common electrode sectors, respectively; and
first to $N^{th}$ lower connection portions electrically connecting the first to $N^{th}$ lower contact portions to the first to $n^{th}$ common terminals.

3. The liquid lens module according to claim 2, wherein the first to $N^{th}$ lower contact portions have shapes protruding toward the first to $N^{th}$ common electrode sectors, respectively.

4. The liquid lens module according to claim 2, wherein each of the first to $n^{th}$ common terminals is electrically connected to a respective lower contact portion of lower contact portions adjacent thereto among the first to $N^{th}$ lower contact portions.

5. The liquid lens module according to claim 2, wherein a number n of the common terminals is half a number N of the common electrode sectors.

6. The liquid lens module according to claim 1, wherein the upper cover comprises a plurality of protrusions protruding from a first contact surface formed to be in contact with the lower cover, and
wherein the lower cover comprises a plurality of recesses formed in a second contact surface, formed to be in contact with the upper cover, at positions corresponding to the plurality of protrusions, the plurality of recesses having a shape corresponding to the plurality of protrusions.

7. The liquid lens module according to claim 1, wherein the upper cover comprises a plurality of recesses formed in a first contact surface formed to be in contact with the lower cover, and
wherein the lower cover comprises a plurality of protrusions protruding from a second contact surface, formed to be in contact with the upper cover, at positions corresponding to the plurality of recesses, the plurality of protrusions having a shape corresponding to the plurality of recesses.

8. The liquid lens module according to claim 1, wherein the upper cover is disposed so as to surround a top surface of the liquid lens and a portion of a side surface of the liquid lens, and
wherein the lower cover is disposed so as to surround a bottom surface of the liquid lens and a remaining portion of the side surface of the liquid lens.

9. The liquid lens module according to claim 1, wherein the upper cover comprises an upper opening disposed at a position oriented in an optical-axis direction or in a second direction in parallel to the optical axis, and
wherein the lower cover comprises a lower opening disposed at a position corresponding to the upper opening in the optical-axis direction or in the second direction.

10. The liquid lens module according to claim 9, comprising an adhesive member disposed in at least one of a first space between the upper cover and the liquid lens or a second space between the lower cover and the liquid lens.

11. The liquid lens module according to claim 10, wherein the adhesive member comprises a first adhesive member disposed in the first space and a second adhesive member disposed in the second space,
wherein the first adhesive member is not disposed at a position overlapping the upper opening and the lower opening in the optical-axis direction and above the first to $M^{th}$ individual electrode sectors, and
wherein the second adhesive member overlaps the upper opening and the lower opening in the optical-axis direction.

12. The liquid lens module according to claim 1, wherein the first to $M^{th}$ upper contact portions have shapes protruding toward the first to $M^{th}$ individual electrode sectors, respectively.

13. The liquid lens module according to claim 1, wherein each of the first to $M^{th}$ contact through-holes is formed at a position located downwards by a predetermined depth from a top surface of the upper cover.

14. A lens assembly, comprising:
a holder comprising one sidewall having a first opening and an opposite sidewall having a second opening formed to face the first opening in a first direction perpendicular to an optical-axis direction; and
a liquid lens module disposed in the holder,
wherein the liquid lens module comprises:

a liquid lens comprising "M" individual electrode sectors (where "M" is a positive integer of 2 or greater) and "N" common electrode sectors (where "N" is a positive integer of 2 or greater);

an upper cover comprising first to $M^{th}$ individual terminals electrically connected to the first to $M^{th}$ individual electrode sectors, respectively, and exposed in the first direction through at least one of the first opening or the second opening; and a lower cover configured to surround the liquid lens together with the upper cover, the lower cover comprising first to $n^{th}$ common terminals (where $1 \leq n \leq N$) electrically connected to the first to $N^{th}$ common electrode sectors and exposed in the first direction through at least one of the first opening or the second opening;

wherein the upper cover comprises first and second outer side surfaces disposed so as to face each other in the first direction, and wherein one of the first to $M^{th}$ individual terminals is disposed on the first outer side surface and another one of the first to $M^{th}$ individual terminals is disposed on the second outer side surface, wherein the upper cover comprises:

the first to $M^{th}$ upper contact portions disposed to be in electrical contact with the first to $M^{th}$ individual electrode sectors, respectively; and first to $M^{th}$ upper connection portions electrically connecting the first to $M^{th}$ upper contact portions to the first to $M^{th}$ individual terminals, respectively, and wherein the first to $M^{th}$ upper contact portions comprise:

first to $M^{th}$ contact through-holes formed at positions respectively corresponding to the first to $M^{th}$ individual electrode sectors; and first to $M^{th}$ conductive members embedded in the first to $M^{th}$ contact through-holes, the first to $M^{th}$ conductive members electrically connecting the first to $M^{th}$ individual electrode sectors to the first to $M^{th}$ upper connection portions, respectively.

15. A camera module, comprising:

an image sensor;

a lens assembly disposed in an optical-axis direction of the image sensor; and a main board on which the image sensor is disposed, the main board being configured to supply a driving voltage, wherein the lens assembly comprises:

a holder comprising one sidewall having a first opening and an opposite sidewall having a second opening formed to face the first opening in a first direction perpendicular to the optical-axis direction; and a liquid lens module disposed in the holder, and wherein the liquid lens module comprises:

a liquid lens comprising "M" individual electrode sectors (where "M" is a positive integer of 2 or greater) and "N" common electrode sectors (where "N" is a positive integer of 2 or greater);

an upper cover comprising first to $M^{th}$ individual terminals electrically connected to the first to $M^{th}$ individual electrode sectors, respectively, and exposed in the first direction through at least one of the first opening or the second opening; and a lower cover configured to surround the liquid lens together with the upper cover, the lower cover comprising first to $n^{th}$ common terminals (where $1 \leq n \leq N$) electrically connected to the first to $N^{th}$ common electrode sectors and exposed in the first direction through at least one of the first opening or the second opening;

wherein the upper cover comprises first and second outer side surfaces disposed so as to face each other in the first direction, and wherein one of the first to $M^{th}$ individual terminals is disposed on the first outer side surface and another one of the first to $M^{th}$ individual terminals is disposed on the second outer side surface.

* * * * *